United States Patent
Amimori et al.

(10) Patent No.: US 8,648,987 B2
(45) Date of Patent: Feb. 11, 2014

(54) TRANSPARENT PRODUCT THAT GIVES IMAGE ONLY AT ONE SIDE

(75) Inventors: Ichirou Amimori, Minami-ashigara (JP); Kouki Takahashi, Minami-ashigara (JP); Satomi Suzuki, Minami-ashigara (JP); Hideki Kaneiwa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 392 days.

(21) Appl. No.: 13/072,376

(22) Filed: Mar. 25, 2011

(65) Prior Publication Data
US 2011/0234946 A1 Sep. 29, 2011

(30) Foreign Application Priority Data
Mar. 26, 2010 (JP) .................... 2010-072685

(51) Int. Cl.
*G02F 1/1335* (2006.01)
(52) U.S. Cl.
USPC ......................................... 349/114
(58) Field of Classification Search
USPC ......................................... 349/114
See application file for complete search history.

(56) References Cited

U.S. PATENT DOCUMENTS 7,965,357 B2 * 6/2011 Van De Witte et al. ....... 349/114

FOREIGN PATENT DOCUMENTS

| JP | 11-65497 A | 3/1999 |
|----|------------|--------|
| JP | 2004-184575 A | 7/2004 |
| JP | 2005-10195 A | 1/2005 |

OTHER PUBLICATIONS

Japanese Office Action dated Mar. 19, 2013 issued in corresponding Japanese patent application No. 2010-072685.

* cited by examiner

*Primary Examiner* — James Dudek
(74) *Attorney, Agent, or Firm* — Birch, Stewart, Kolasch & Birch, LLP

(57) ABSTRACT

A transparent product that gives an image only at one side, which can be used for an advertisement on the window or the like, which is a product that has a semi-transmissive-half-reflective layer having transmittance of 30% or higher and a reflectance of 30% or higher, a birefringent layer which is a patterned optically anisotropic layer having two or more regions of different birefringence in the form of a pattern or a driven-type optically anisotropic layer containing a liquid-crystal compound driven by voltage application to control the optical anisotropy, and a polarizing layer in this order and does not have, at the opposite side of the polarizing layer with respect to the birefringent layer, a polarizing layer, is provided.

20 Claims, 4 Drawing Sheets (a)

(b)

(c)

Unit: mJ/cm²

TRANSPARENT PRODUCT THAT GIVES IMAGE ONLY AT ONE SIDE

CROSS-REFERENCE TO RELATED APPLICATIONS

This application claims benefit of priority under 35 USC 119 to Japanese Patent Application No. 2010-072685 filed on Mar. 26, 2010, which is expressly incorporated by reference herein in its entirety.

TECHNICAL FIELD

The present invention relates to a transparent product that gives an image only at one side. The present invention particularly relates to a transparent product that gives an image derived from a birefringent pattern only at one side

BACKGROUND ART

A transparent product having a specific image visible from one side and substantially invisible from the opposite side of its surface is useful for presenting an advertisement by applying it to a glass surface. For this purpose, hologram, half mirror, and optical products having special visual effects such as pearl-like gloss have been used. For example, Japanese Unexamined Patent Publication (KOKAI) No. 2005-10195, the disclosure of which is expressly incorporated by reference herein in its entirety, discloses an electric advertising device with semi-transmissive and half-reflective half mirror in which an advertising display and a mirror display are exchanged by exchanging the backside light source. Japanese Unexamined Patent Publication (KOKAI) No. (Heisei) 11-65497, the disclosure of which is expressly incorporated by reference herein in its entirety, discloses an advertising device for automobile using a perforated plastic film, which has directionality such that from the bright outside only the advertisement can be seen and dark inside cannot be seen, and from the dark inside the bright outside view can be seen through the through-hole. Either device controls transmission and reflection ratio of the optical product and achieves the special visual effect by changing the balance of the brightness of both sides of the optical product.

However, the directionality is controlled only by the brightness of the environment in either case. Therefore, when the brightness of the environment changes because of night and day, for example, the directionality is damaged. Particularly, in the transmissive type device that is to be seen from the both sides as the device disclosed in Japanese Unexamined Patent Publication (KOKAI) No. (Heisei) 11-65497, the advertising display becomes disturbance as the bright outside is seen through from the dark inside. When the advertisement of Japanese Unexamined Patent Publication (KOKAI) No. (Heisei) 11-65497 is used for advertisement on the window of a building, visibility from the inside of the building has been improved compared to an advertisement with a normal printing but total invisibility has not been achieved.

SUMMARY OF THE INVENTION

The present invention has for its object to provide a transparent product that gives a specific reflected image at one side but does not give the reflected image at the opposite side.

The present inventors conducted extensive research into achieving the above object, resulting in the discovery that provision of an image at one side of a layer could be achieved by combining an optically anisotropic layer having two or more regions of different birefringence in the form of a pattern with a semi-transmissive-half-reflective layer and a polarizing layer.

The present invention thus provides [1] to [10] below:

[1] A product comprising a semi-transmissive-half-reflective layer having transmittance of 30% or higher and a reflectance of 30% or higher, a birefringent layer, and a polarizing layer in this order, and not comprising, at the opposite side of the polarizing layer with respect to the birefringent layer, a polarizing layer.

[2] The product according to [1], wherein the birefringent layer is a patterned optically anisotropic layer having two or more regions of different birefringence in the form of a pattern.

[3] The product according to [2], wherein the regions of different birefringence in the form of a pattern are regions of different retardation or different slow axis.

[4] The product according to [2], wherein the patterned optically anisotropic layer comprises a region of retardation of 30 to 1000 nm and a region of retardation less than 30 nm.

[5] The product according to any one of [2] to [4], wherein the patterned optically anisotropic layer is a layer that is formed of a composition comprising a liquid-crystal compound having at least one reactive group.

[6] The product according to [5], wherein the patterned optically anisotropic layer is formed by a method comprising steps (1) to (3) below:
(1) irradiating with heat or light a layer formed of a composition comprising a liquid-crystal compound;
(2) subjecting the layer to a patterned light exposure; and
(3) heating the layer obtained to 50° C. or higher but not higher than 400° C.

[7] The product according to [1], wherein the birefringent layer is a driven-type optically anisotropic layer.

[8] The product according to [7], wherein the driven-type optically anisotropic layer is a layer comprising a liquid-crystal compound driven by voltage application and the product comprises two electrode layers for the voltage application.

[9] The product according to [8], wherein one of the two electrode layers is the semi-transmissive-half-reflective layer.

[10] The product according to any one of [1] to [9], wherein the polarizing layer is an absorption-type polarizing layer prepared by uniaxially stretching a film comprising a polyvinyl alcohol doped with iodine or a dichroism pigment.

[11] The product according to any one of [1] to [9], wherein the polarizing layer is a reflection-type polarizing layer prepared by uniaxially stretching a laminated film formed by carrying out alternate lamination of two kind of polymer layers of different birefringence each of which is 20 to 300 nm in thickness.

[12] The product according to any one of [1] to [9], wherein the polarizing layer is a layer comprising a cholesteric liquid-crystal to selectively reflect circular polarized light.

[13] The product according to any one of [1] to [9], wherein the polarizing layer is a layer comprising a mixture of a polymeric liquid-crystal compound and a dichroism pigment being oriented by using the liquid-crystallinity and then fixed in the orientation by polymerization.

[14] The product according to any one of [1] to [9], wherein the polarizing layer is a layer comprising a liquid-crystal dichroism pigment being oriented by using the liquid-crystallinity.

[15] The product according to any one of [1] to [14], which is used for an advertisement.

[16] Window glass which is applied with the product according to any one of [1] to [15].

[17] A pair of eyeglasses which are applied with the product according to any one of [1] to [15].

Effect of the Invention

A transparent product that gives an image at only one side is provided by the present invention.

MODES OF CARRYING OUT THE INVENTION

Figure 1:
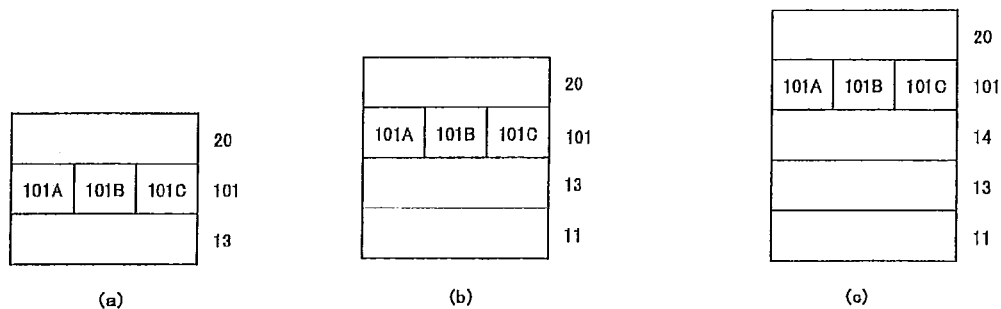
FIG. 1: Diagrams showing typical structures of products having patterned optically an isotropic layers.

The present invention is described in detail below.

In the present description, a "to" is employed to mean that the upper limit value and lower limit value of the numeric values indicated before and after it are included.

In the present description, the terms "phase differential," "retardation," and "Re" denote in-plane retardation. The in-plane retardation (Re θ) can be measured by the spectral phase differential method by conversion from a transmission or reflectance spectrum to a phase differential by the method described in the Journal of the Optical Society of America, Vol. 39, p. 791-794 (1949) and Japanese Unexamined Patent Publication (KOKAI) No. 2008-256590, the disclosures of which are expressly incorporated by reference herein in their entireties. The above references are measurement methods that employ transmission spectra. Since the light passes through the optically anisotropic layer twice, particularly in the case of reflection, half of the phase differential converted from the reflection spectrum can be employed as the phase differential of the optically anisotropic layer. Re0 is the frontal retardation. Re(λ) is the retardation employing light of wavelength λ nm as the measurement beam. The retardation or Re in the present description means the retardation measured at the wavelengths of 611±5 nm, 545±5 nm, and 435±5 nm for R, G, and B, and means the retardation measured at a wavelength of 545±5 nm or 590±5 nm when no reference to color is given.

In the present description, use of the word "essentially" in reference to an angle means that the difference from the precise angle falls within a range of less than ±5°. The difference from the precise angle is preferably less than 4°, and is more preferably less than 3°. In reference to retardation, the word "essentially" means a difference in retardation of within ±5°, inclusive. A "retardation of essentially 0" means a retardation of 5 nm or less. Unless specifically stated otherwise, the wavelength at which a refractive index is measured refers to any wavelength within the visible light region. In the present description, the term "visible light" refers to light with a wavelength of from 400 to 700 nm.

[Transparent Product Giving Image at Only One Side]

A product of the present invention includes at least a semi-transmissive-half-reflective layer, a birefringent layer, and a polarizing layer in this order.

A semi-transmissive-half-reflective layer simultaneously has a property to reflect light and a property to transmit light. By employing such a layer, transparency can be maintained in a product having the layer and another substantially transparent layer, and simultaneously a reflected image can be provided by combining a birefringent layer and a polarizing layer. The semi-transmissive-half-reflective layer may also have functions of an electrode layer or the like.

The birefringent layer may be a patterned optically anisotropic layer or a driven-type optically anisotropic layer described below.

In the product of the present invention, polarized light passed through a polarizing layer passes through the birefringent layer reflects off the semi-transmissive-half-reflective layer, and passes back through the birefringent layer. Light of differing elliptical polarization within the plane is caused to exit, and passes through the polarizing layer again on the measurement point side, rendering information visible.

As will be understood by the above principle, when the product is observed from the side of the semi-transmissive-half-reflective layer with respect to the birefringent layer, the above information cannot be visually recognized, and substantial transparency in the whole surface can be achieved. In the present description, "transparency" means an about 30% or more transmittance of light.

The product of the present invention can thus give an image only at one side by not including a polarizing layer at the opposite side of the above polarizing layer. More preferably, the product of the present invention does not have a polarizing layer at the opposite side of the polarizing layer with respect to the semi-transmissive-half-reflective layer.

[Semi-Transmissive-Half-Reflective Layer]

The semi-transmissive-half-reflective layer may have a transmittance of 30% or higher, preferably 35% or higher, more preferably 45% or higher, and reflectance of 30% or higher, preferably 35% or higher, more preferably 45% or higher. A semi-transmissive-half-reflective layer can be preferably manufactured by the method of reducing the thickness of a metal layer, which is inexpensive. A semi-transmissive-half-reflective layer of metal absorbs light. Thus, a dielectric multilayer film that permits control of transmission and reflection without absorption is preferred from the perspective of light-use efficiency. A semi-transmissive-half-reflective layer may also be functions as an electrode layer. Further, the semi-transmissive-half-reflective layer in, for example, a product having a patterned optically anisotropic layer as the birefringent layer can be provided on a patterned birefringent product after the birefringence pattern formation or already provided in a birefringence pattern builder before the birefringence pattern formation.

[Polarizing Layer]

A polarizing layer is a layer in which a transmittance of a polarized light in a certain polarization state and a transmittance of a polarized light with a phase different in 180 degree from the former polarized light are different more than 10%. Generally, an absorption-type polarizing layer is employed, which is, for example, prepared by uniaxially stretching in water or in air a film of polymer such polyvinyl alcohol (PVA) doped with iodine or a dichroism pigment to make the dichromic iodine complex or the dichroism pigment aligned in the stretching direction. In addition to the absorption-type polarizing layer, examples of the polarizing layers include a reflection-type polarizing layer (DBEF) prepared by uniaxially stretching a laminated film formed by carrying out alternate lamination of two kind of polymer layers of different birefringence, each of which layers is 20 to 300 nm in thickness; a circular polarizing layer containing a cholesteric liquid-crystal; a layer containing a mixture of a polymeric liquid-crystal compound and a dichroism pigment being oriented by using the liquid-crystallinity and then fixed in the orientation by polymerization; a layer comprising a mixture of a liquid-crystal dichroism pigment being oriented by using the liquid-crystallinity; a scattering-type polarizing layer prepared by uniaxially stretching a film having two polymers of different birefringence after a phase separation; and a scattering-type polarizing layer prepared by uniaxially stretching a polymer-dispersed liquid crystal film.

[Birefringent Layer]

The birefringent layer may be a patterned optically anisotropic layer or a driven-type optically anisotropic layer. Each layer will be explained as below.

[Patterned Optically Anisotropic Layer]

In the present description, "a patterned optically anisotropic layer" is a layer having two or more regions of differing birefringence in the form of a pattern. The patterned optically anisotropic layer may have two or more regions of differing birefringence, preferably may have three or more regions of differing birefringence. Individual regions of identical birefringence can be continuous or discontinuous in shape.

The patterned optically anisotropic layer can easily be prepared by using the after-mentioned birefringence pattern builder, for example. However, the preparation method is not particularly limited as long as it is layer having regions of differing birefringence in the form of a pattern.

In the present description, a term as "birefringence pattern" is also used.

Broadly defined, a birefringence pattern is the two-dimensional in-plane or three-dimensional patterning of two or more domains of differing birefringence. In particular, two-dimensionally within a plane, the birefringence is defined by the two parameters of the direction of the slow axis in which the refractive index peaks in-plane and the magnitude of retardation within the domain. For example, in-plane oriented defects and the inclination distribution of liquid crystals in the direction of thickness in a phase differential film based on a compound with liquid crystallinity can also be said to constitute a birefringence pattern in a broad sense. However, in a narrow sense, patterning that is achieved by intentionally controlling birefringence based on a predetermined design is desirably defined as a birefringence pattern. In the present invention, a birefringence pattern can be a pattern that is formed of domains of differing magnitudes of retardation in which the direction of the slow axis is constant, a pattern that is formed of domains in which the directions of the slow axes differ, or a pattern that is formed of domains of both differing slow axis directions and retardation magnitudes. Of these, the birefringence pattern in the present invention is preferably a pattern that is formed of domains of differing magnitudes of retardation in which the direction of the slow axis is constant. Unless specifically stated otherwise, the birefringence pattern can be comprised of multiple layers, and the boundaries between the patterns of the multiple layers can align or be different.

Figure 2:
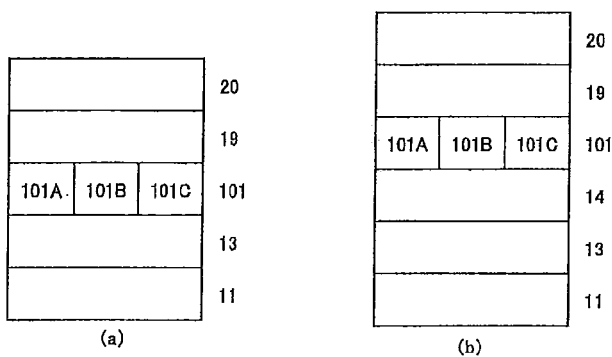
FIG. 2: Diagrams showing typical structures of products having patterned optically anisotropic layers each having an additive layer.
Figure 3:
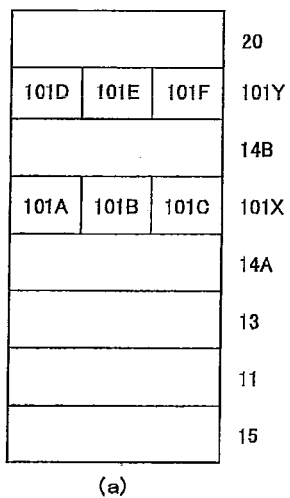
FIG. 3: Diagrams showing typical structures of products each including multiple patterned optical anisotropic layers.

FIGS. 1 to 3 are examples of products of present invention having patterned optically anisotropic layers. Each product has a semi-transmissive-half-reflective layer 13, a patterned optically anisotropic layer 101, and a polarizing layer 20 in this order.

In the figures, regions of differing birefringence are illustrated as 101A, 101B, and 101C.

The patterned birefringent product shown in FIG. 1(a) shows the structure of the most basic product having a patterned optically anisotropic layer. A product of such a structure can be used by applying it to the surface of window glass with an adhesive or contact adhesive.

FIG. 1(b) shows an example of a product having a support.

FIG. 1(c) is an example having an orientation layer 14. When employing a layer formed of an optically anisotropic layer that has been fixed by polymerization by heating or irradiation with light after applying and drying a solution containing a liquid-crystal compound to form a liquid-crystal phase as patterned optically anisotropic layer 101, orientation layer 14 functions to facilitate orientation of the liquid-crystal compound.

The patterned birefringent products shown in FIGS. 2(a) and (b) have additive layers. Additive layers include layers for subsequently adding a plasticizer or a photopolymerization initiator to an optically anisotropic layer as set forth further below, hardcoat layers for surface protection, water-repellent layers to keep fingerprints from sticking and to prevent doodling with magic markers, electrically conductive layers imparting touch panel properties, blocking layers that make the product invisible to an IR camera by not transmitting IR radiation, circularly polarized light-selective reflective layers in which an image is made to disappear by a circularly polarized light filter by not passing left or right circularly polarized light, photosensitive layers imparting photosensitivity to an optically anisotropic layer, antenna layers functioning as RFID antennas, immersion-detecting layers that detect immersion in water by changing color or the like when immersed in water, thermotropic layers that change color based on temperature, coloration-filtering layers that control the colors of latent images, transmitting-type polarized layers in which latent images become visible when a switch is made between polarized light/unpolarized light on the light source side, magnetic layers that impart magnetic recording properties, as well as layers that function as matte layers, scattering layers, lubricating layers, photosensitive layers, antistatic layers, and resist layers.

The patterned birefringent product shown in FIG. 3(a) has multiple patterned optically anisotropic layers. The in-plane slow axes of the multiple optically anisotropic layers can be identical or different, but are preferably different. The regions of multiple optically anisotropic layers of differing birefringence can align or be different. Although not shown, there can be three or more patterned optically anisotropic layers. By providing two or more optically anisotropic layers of mutually differing retardation or slow axes and imparting independent patterns to each, latent images with various functions can be formed.

[The Birefringence Pattern Builder]

A method employing a birefringence pattern builder, an example of the method of forming a product having a patterned optically anisotropic layer, will be described below. A birefringence pattern builder refers to a material for fabricating a birefringence pattern that can be used to fabricate a product having a patterned optically anisotropic layer through a series of prescribed steps. Unless specifically stated otherwise, the method of forming a birefringence pattern is not limited to this method.

The birefringence pattern builder can normally be in the form of a film or sheet. The birefringence pattern builder can be comprised of an optically anisotropic layer alone, or can further comprise functional layers imparting various secondary functions. Examples of functional layers are supports, orientation layers, semi-transmissive-half-reflective layers, and adhesives layers. A birefringence pattern builder that is employed as a transfer material, or a birefringence pattern builder that is fabricated using a transfer material can comprise a temporary support or a dynamic property control layer.

A birefringence pattern builder having a structure as illustrated below can be transferred on a semi-transmissive-half-reflective layer, a polarizing layer, or any other targeted product by using an adhesive or a contact adhesive.

Figure 4:
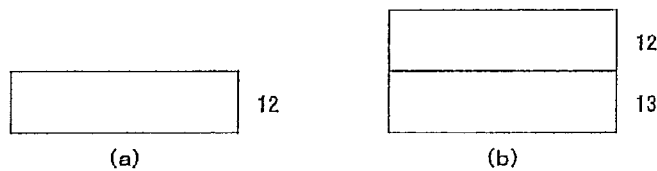
FIG. 4: Diagrams showing typical structures of basic birefringence pattern builders.

The birefringence pattern builder shown in FIG. 4(a) is an example of a birefringence pattern builder comprised of an optically anisotropic layer 12 with self-supporting capability.

The optically anisotropic layer is a birefringent layer, and can be in the form of a layer in which a uniaxially or biaxially-stretched polymer or an oriented liquid-crystal compound has been fixed, an organic or inorganic single-crystal layer of aligned orientation, or the like. The optically anisotropic layer is preferably a layer that has the function of permitting control of the optical anisotropy at will through patterned light exposure such as exposure to light through a photomask or digital exposure; patterned heating such as with a hot stamp, thermal head, or UV radiation laser beam exposure; stylus drawing by mechanically applying pressure or shear with a pin or pen; printing a reactive compound; or the like. This is because an optically anisotropic layer having such a function facilitates the obtaining of a patterned optically anisotropic layer by the method set forth further below. The use of patterned light exposure such as exposure to light through a photomask or scanning optical exposure is preferable for pattern formation. The patterning step can be combined with bleaching, development, or the like by means of heat or chemicals as needed in forming a pattern. In that case, heat bleaching and development are preferable because they place few limitations on the support. The birefringence pattern builder shown in FIG. 4(b) is an example of forming a semi-transmissive-half-reflective layer 13 on an optically anisotropic layer 12 that is capable of self-support.

Figure 5:
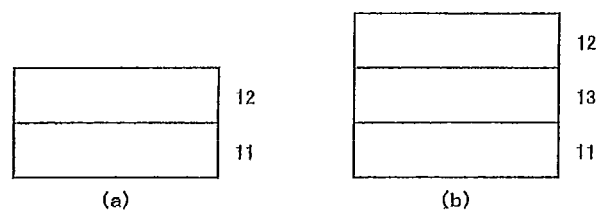
FIG. 5: Diagrams showing typical structures of birefringence pattern builders each having an optically anisotropic layer on a support or temporary support.

FIGS. 5(a) and (b) are examples of an optically anisotropic layer 12 present on a support.

Figure 6:
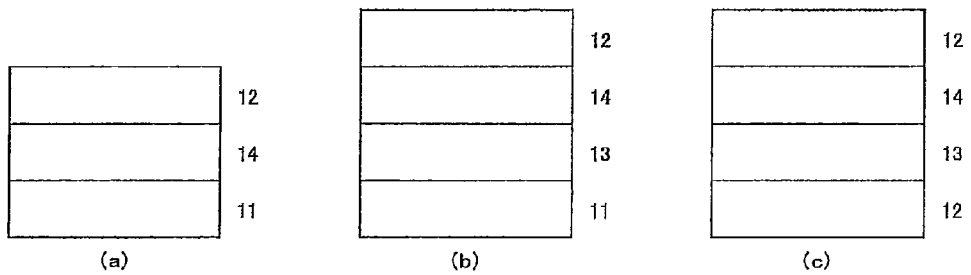
FIG. 6: Diagrams showing typical structures of birefringence pattern builders each having an orientation layer.
Figure 7:
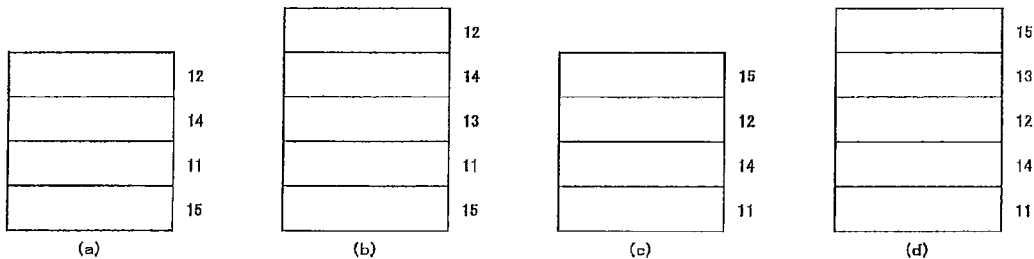
FIG. 7: Diagrams showing typical structures of birefringence pattern builders each having an adhesive layer.
Figure 8:
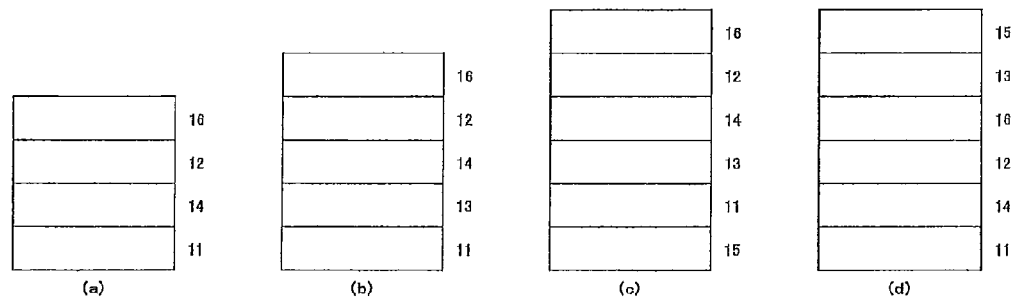
FIG. 8: Diagrams showing typical structures of birefringence pattern builders each having a printed layer.
Figure 9:
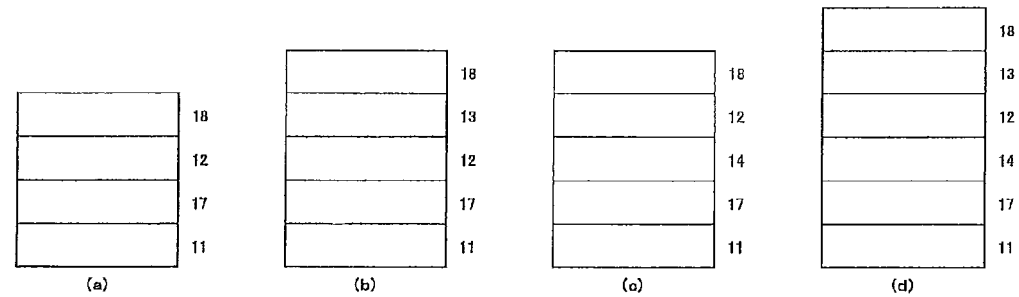
FIG. 9: Diagrams showing typical structures of transfer-type birefringence pattern builders each having a dynamic property control layer and a transfer layer.
Figure 10:
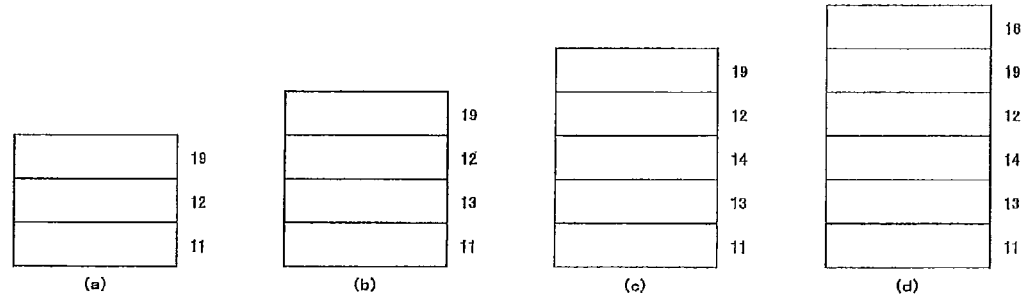
FIG. 10: Diagrams showing typical structures of birefringence pattern builders each having an additive layer.

FIGS. 6(a) to (c) are examples of birefringence pattern builders each having an orientation layer 14.

FIGS. 7(a) to (d) are examples of birefringence pattern builders having adhesive layers.

FIGS. 8(a) to (d) are examples of birefringence pattern builders having printed layers.

FIGS. 9(a) to (d) are examples of transfer-type birefringence pattern builders having dynamic property control layers and transfer layers.

FIGS. 10(a) to (d) are examples of birefringence pattern builders having additive layers.

Figure 11:
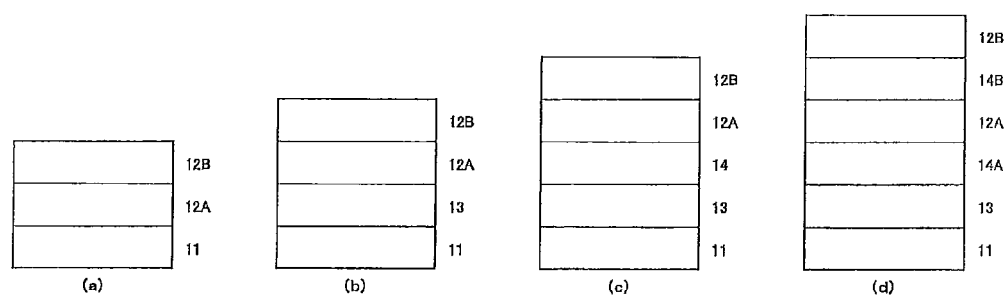
FIG. 11: Diagrams showing typical structures of birefringence pattern builders each including multiple patterned optical anisotropic layers.

The birefringence pattern builders shown in FIGS. 11(a) to (d) have multiple optically anisotropic layers. The in-plane show axes of the multiple optically anisotropic layers can be identical or different, but are preferably different. Although not shown, there may be three or more optically anisotropic layers. When forming optically anisotropic layers of liquid-crystal compounds, the presence of an orientation layer is preferable. More preferably, the orientation layer can be omitted, as shown in FIG. 11(c), by having an optically anisotropic layer double as an orientation layer. By employing a transfer-type birefringence pattern builder, the fabrication of a product having multiple layers with birefringence patterns can be facilitated.

The birefringence pattern builder, the method of manufacturing a product having a patterned optically anisotropic layer employing the birefringence pattern builder, materials will be described in detail below. The present invention is not limited to the embodiments described below, and implementations of other embodiments are possible by referring to the description set forth below and to conventionally known methods.

[The Optically Anisotropic Layer]

The optically anisotropic layer in the birefringence pattern builder is a layer having optical properties such that the retardation in at least one direction of incidence is essentially 0 when measured, that is, a layer that is not isotropic.

Examples of the optically anisotropic layer in the birefringence pattern builder are a layer containing at least one monomer or oligomer and their cured products; a layer containing at least one polymer; and a layer containing at least one organic or inorganic single crystal.

An optically anisotropic layer containing a polymer is preferred from the perspective of being able to satisfy various different requirements, such as birefringence, transparency, resistance to solvents, toughness, and flexibility. The polymer in the optically anisotropic layer preferably contains an unreacted reactive group. When crosslinking of polymer chains occurs due to the reaction of unreacted reactive groups when exposed to light, the degree of crosslinking of polymer chains varies due to exposure to light under different conditions. As a result, the retardation level changes, which is considered to facilitate the formation of a birefringence pattern.

The optically anisotropic layer is preferably solid at 20° C., more preferably solid at 30° C., and still more preferably, solid at 40° C. This is because the application of other functional layers, transfer and bonding to the support, and the like are facilitated when the optically anisotropic layer is solid at 20° C. For the application of other functional layers, the optically anisotropic layer preferably has resistance to solvents. In the present description, the phrase "has resistance to solvents" means that the retardation following immersion for two minutes in the target solvent falls within a range of 30% to 170%, preferably falls within a range of 50% to 150%, and optimally falls within a range of from 80% to 120% of the retardation prior to the immersion. Examples of target solvents are water, methanol, ethanol, isopropanol, acetone, methyl ethyl ketone, cyclohexanone, propylene glycol monomethyl ether acetate, N-methylpyrrolidone, hexane, chloroform, and ethyl acetate. Preferred examples are acetone, methyl ethyl ketone, cyclohexanone, propylene glycol monomethyl ether acetate, and N-methylpyrrolidone. Optimal examples include methyl ethyl ketone, cyclohexanone, propylene glycol monomethyl ether acetate, and mixed solvents thereof.

The optically anisotropic layer may have a retardation of 5 nm or higher at 20° C. A retardation of 10 nm or higher and 10,000 nm or lower is preferable, and a retardation of 20 nm or higher and 2,000 or lower is optimal. At a retardation of 5 nm or lower, the formation of a birefringence pattern may become difficult. When the retardation exceeds 10,000 nm, the error increases and it sometimes becomes difficult to achieve a precision permitting practical use.

The method of preparing the optically anisotropic layer is not specifically limited. Examples include: the preparation method of applying and drying a solution containing a liquid-crystal compound having at least one reactive group to form a liquid-crystal phase, and then heating it or irradiating it with light to fix it by polymerization; the preparation method of stretching a layer in which a monomer having two or more reactive groups has been fixed by polymerization; the method of stretching a layer comprised of a polymer having a reactive group in a side chain; and the method of stretching a layer comprised of a polymer and then using a coupling agent or the like to introduce a reactive group. As set forth further below, the optically anisotropic layer can be formed by transfer. The thickness of the optically anisotropic layer is preferably 0.1 to 20 micrometers and more preferably 0.5 to 10 micrometers.

[An Optically Anisotropic Layer in which a Composition Containing a Liquid-Crystal Compound has been Oriented and Fixed]

The case where the optically anisotropic layer is prepared by applying and drying a solution containing a liquid-crystal compound having at least one reactive group to form a liquid-crystal phase, and then heating it or irradiating it with light to fix it by polymerization will be described below. This preparation method is preferable to the method of preparation by stretching a polymer to obtain an optically anisotropic layer set forth further below in that it readily yields an optically anisotropic layer of equivalent retardation in a thin film.

[The Liquid-Crystal Compound]

Generally, liquid-crystal compounds can be grouped into rod-like-types and discotic-types based on their shape. Each of these also comprises low molecular and high molecular types. "High molecular" generally refers to a degree of polymerization of 100 or higher (High Molecular Physics—Phase Transition Dynamics, Masao Doi, p. 2, Iwanami Shoten, 1992, the disclosure of which is expressly incorporated by reference herein in its entirety). In the present invention, any liquid-crystal compound can be employed, but the use of a rod-like liquid-crystal compound is preferred.

In the present description, it is not necessary for a compound having liquid crystallinity to be contained in the layer that is formed from a composition containing a liquid-crystal compound. For example, the layer may contain a high-molecular weight compound, no longer exhibiting liquid crystallinity, which is formed by carrying out polymerization or crosslinking reaction of the low molecular liquid-crystal compound having a reactive group capable of thermal reaction or photo reaction under heating or under irradiation of light. Further, two or more rod-like liquid-crystal compounds, two or more discotic liquid-crystal compounds, or a mixture of a rod-like liquid-crystal compound and a discotic liquid-crystal compound can be employed as the liquid-crystal compound. Since temperature change and humidity change can be reduced, use of discotic liquid-crystal compounds or rod-like liquid-crystal compounds having reactive groups is preferable. It is of still greater preference for at least one of them to contain two or more reactive groups per liquid-crystal molecule. In the case of a mixture of two or more liquid-crystal compounds, at least one of them preferably have two or more reactive groups.

A liquid-crystal compound having two or more reactive groups with different crosslinking mechanisms is preferably employed. An optically anisotropic layer containing a polymer having an unreacted reactive group can then be prepared by causing just a portion of the two or more reactive groups to polymerize through the selection of conditions. The crosslinking mechanism is not specifically limited, and can consist of a condensation reaction, hydrogen bonding, polymerization, or the like. Of the two or more mechanisms, at least one is preferably polymerization, and the use of two or more different forms of polymerization is preferable. Generally, not only the vinyl groups, (meth)acrylic groups, epoxy groups, oxetanyl groups, and vinyl ether groups that are employed in polymerization, but also hydroxyl groups, carboxylic acid groups, amino groups, and the like can be employed in the crosslinking reaction.

In the present description, the phrase "a compound having two or more reactive groups with different crosslinking mechanisms" means a compound that can be crosslinked in stages with different crosslinking reaction steps. In the crosslinking reaction step of each stage, a reactive group reacts as a functional group according to its respective crosslinking mechanism. Further, for example, in the case of a polymer such as a polyvinyl alcohol having a hydroxyl group in a side chain, when the hydroxyl group in the side chain has been crosslinked with an aldehyde or the like following the polymerization reaction that polymerizes the polymer, two or more different crosslinking mechanisms have been employed. However, in the present description, a compound having two or more different reactive group preferably means a compound having two or more different reactive groups in a layer at the point where the layer has been formed on a support or the like, and the reactive groups therein can be subsequently crosslinked in stages. As a particularly preferable embodiment, the use of a liquid-crystal compound having two or more polymerizable groups is preferred. The reaction conditions causing crosslinking in stages can be different temperatures, different wavelengths of light (the radiation of light), or different polymerization mechanisms. From the perspective of separating the reaction, the use of different polymerization mechanisms is preferred, and control by means of the type of initiator employed is preferable. The combination of a radically polymerizable group and a cationically polymerizable group as polymerization mechanisms is preferred. A combination in which the radically polymerizable group is a vinyl group or (meth)acrylic group, and the cationically polymerizable group is an epoxy group, oxetanyl group, or vinyl ether group is particularly preferred because of the ease of controlling the polymerization properties. Examples of reactive groups are given below.

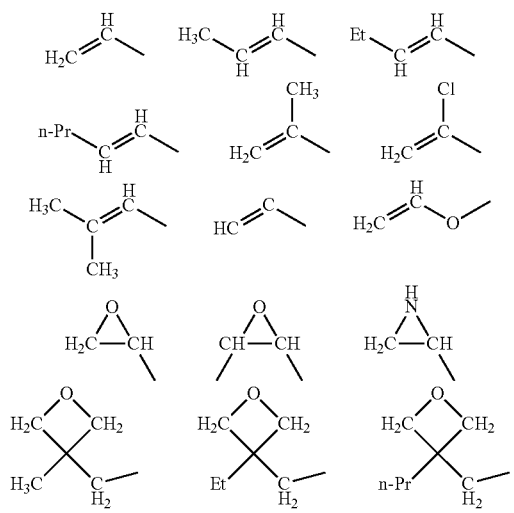

-continued

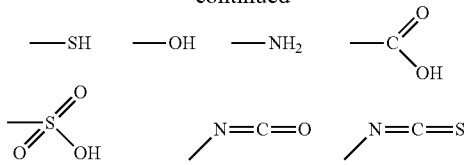

Azomethines, azoxy compounds, cyanobiphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, and alkenyl cyclohexylbenzonitriles are preferably employed as rod-like liquid-crystal compounds. Not only low molecular liquid-crystal compounds such as the above, but high molecular liquid-crystal compounds can also be employed. These high molecular liquid-crystal compounds are obtained by polymerizing low molecular rod-like liquid-crystal compounds having a reactive group. Examples of rod-like liquid-crystal compounds are those described in Japanese Unexamined Patent Publication (KOKAI) No. 2008-281989, Published Japanese Translation (TOKUHYO) Heisei No. 11-513019 of a PCT International Application (WO97/00600), and Published Japanese Translation (TOKUHYO) No. 2006-526165 of a PCT international Application (WO2004/090025), the disclosures of which are expressly incorporated by reference herein in their entireties.

Specific examples of rod-like liquid-crystal compounds are given below. However, the present invention is not limited thereto. The compounds represented by general formulas (I)-1 to 7 can be synthesized by the method described in Published Japanese Translation (TOKUHYO) Heisei No. 11-513019 of a PCT International Application (WO97/00600), the disclosure of which is expressly incorporated by reference herein in its entirety.

I-1

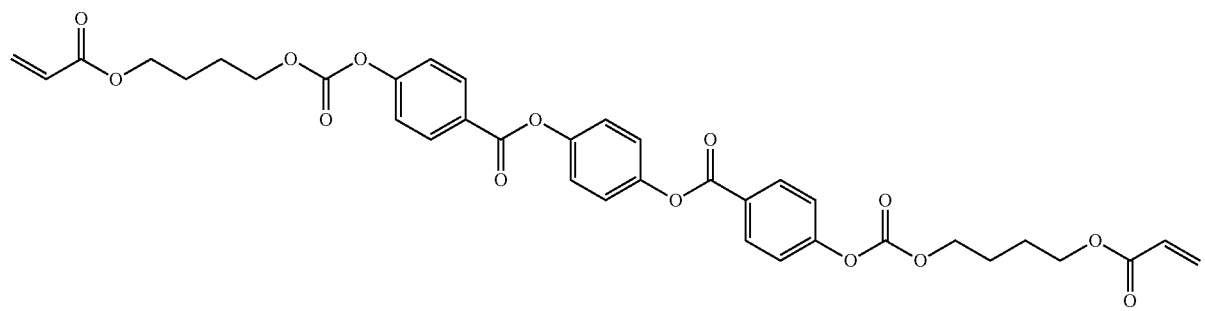

I-2

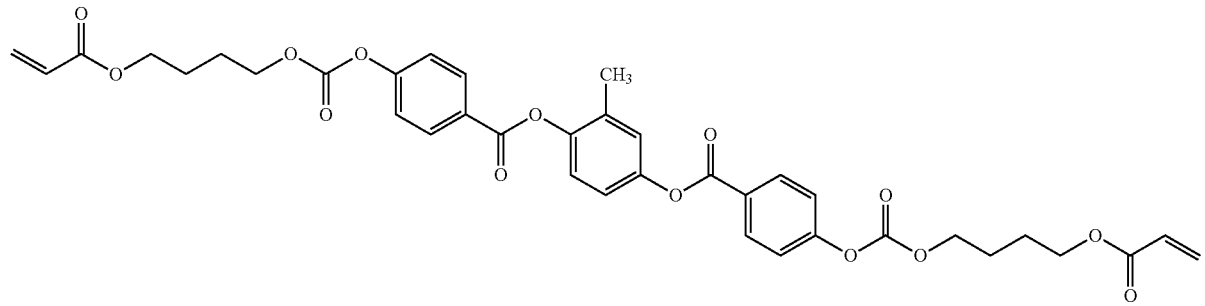

I-3

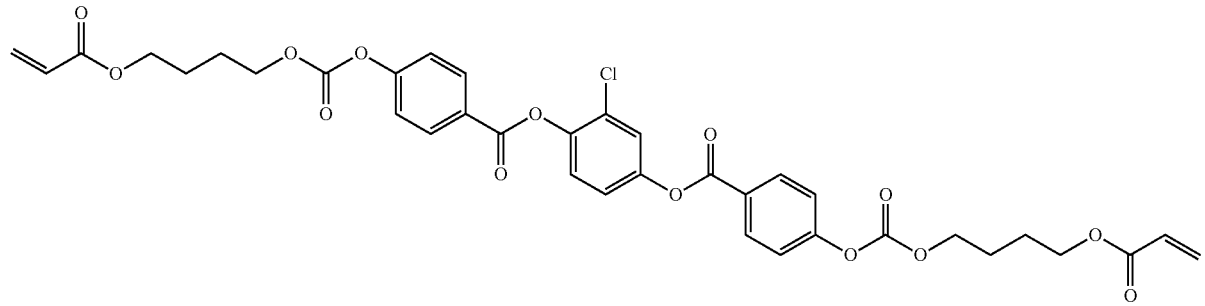

I-4
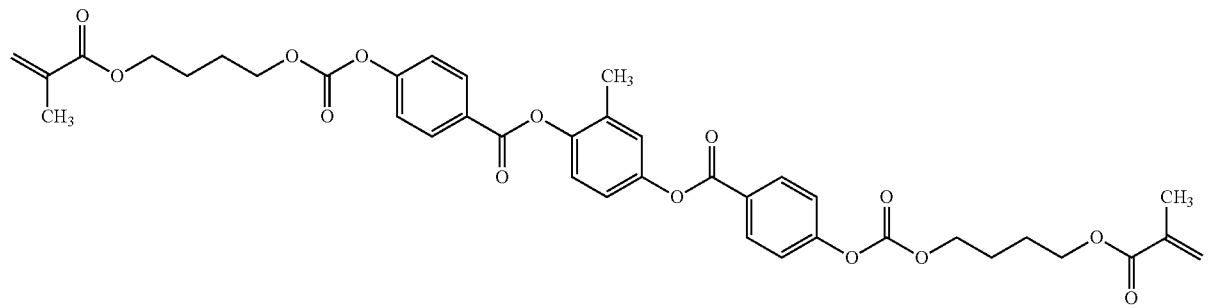
I-5
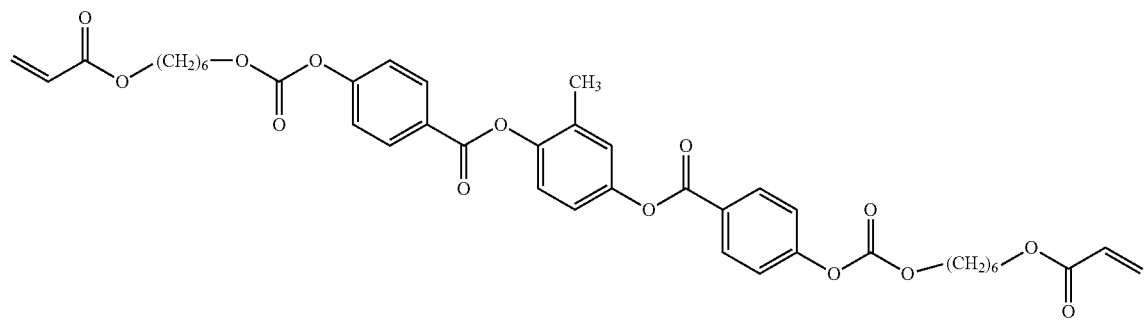
I-6
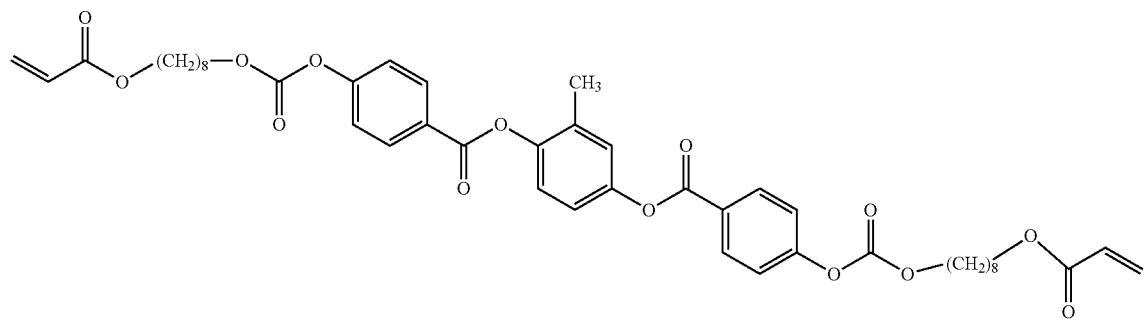
I-7
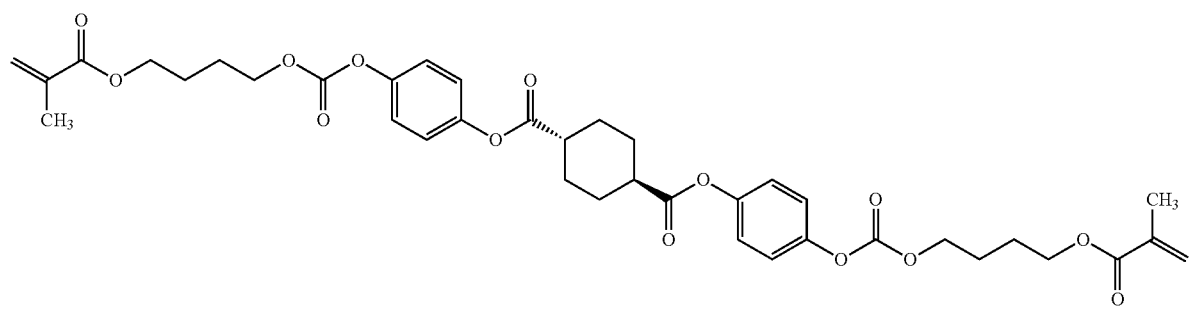
I-8
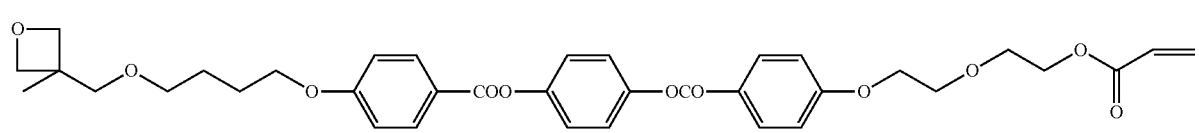
I-9
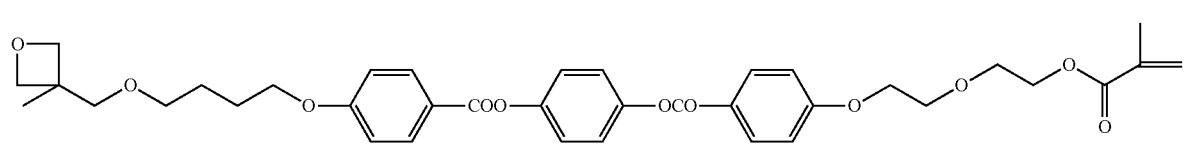

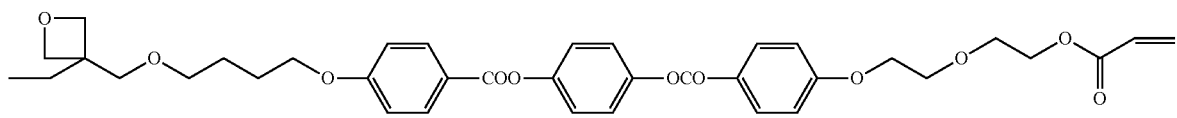
I-10
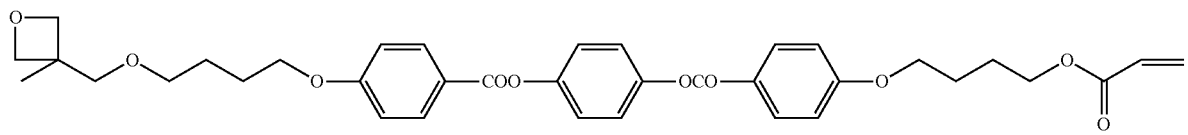
I-11
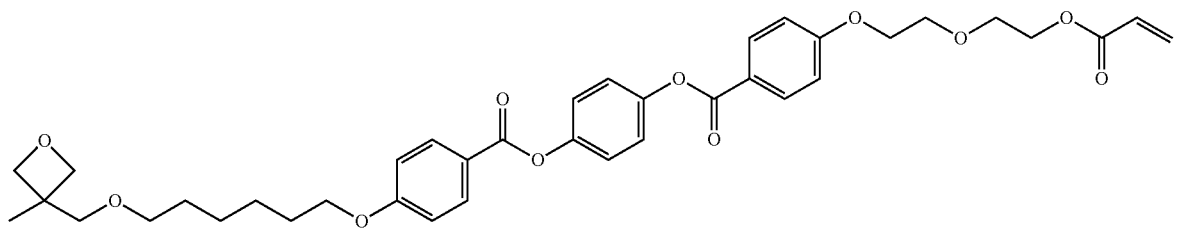
I-12
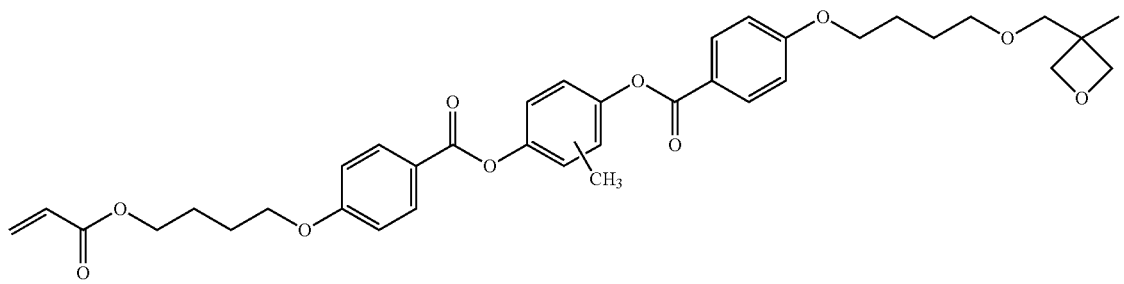
I-13
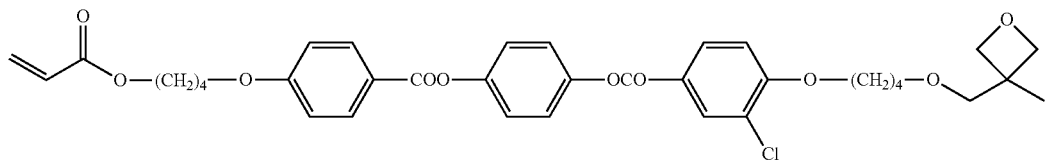
I-14
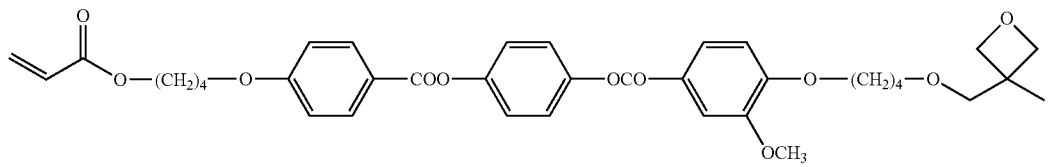
I-15
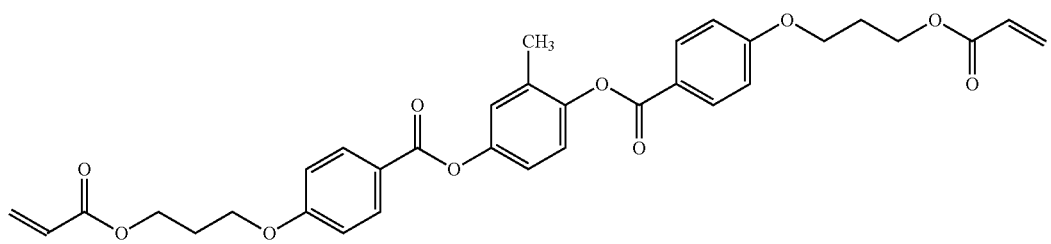
I-16

I-17

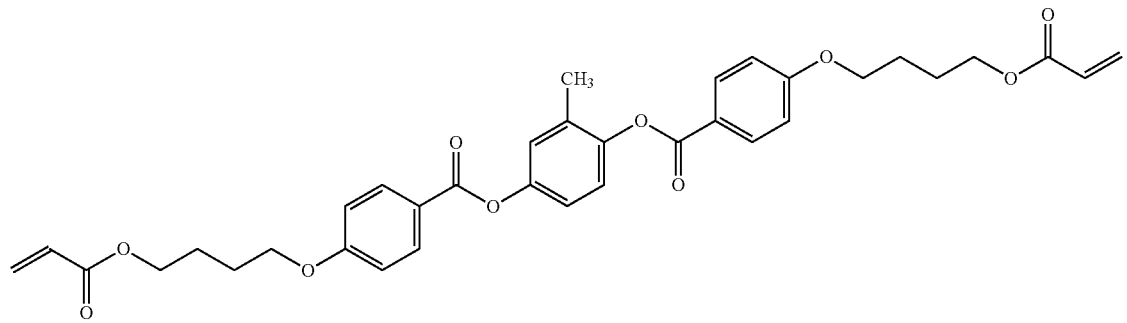

I-18

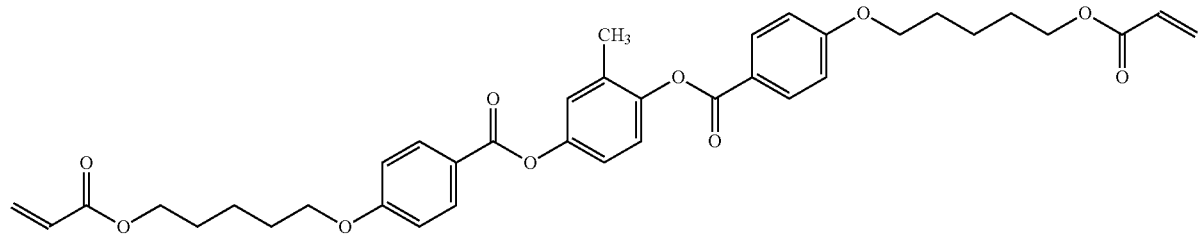

I-19

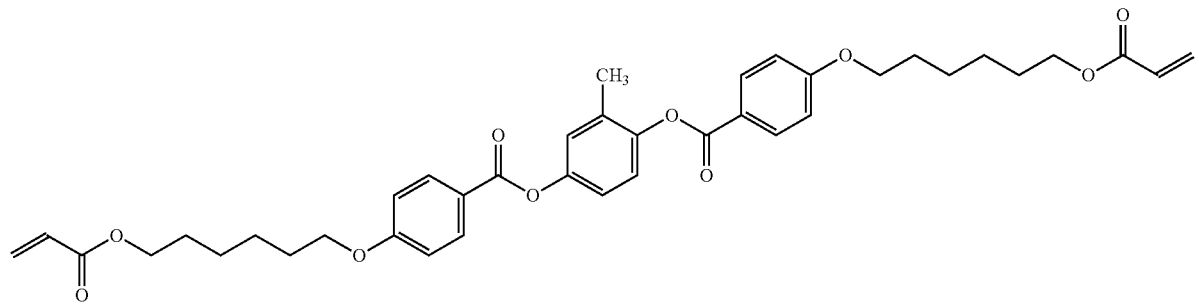

In another embodiment of the present invention, discotic liquid crystals are employed in the optically anisotropic layer. The optically anisotropic layer is preferably a layer of low-molecular-weight discotic liquid-crystal compounds such as monomers, or a layer of polymers obtained by polymerizing (curing) polymerizable discotic liquid-crystal compounds. Examples of discotic liquid-crystal compounds include the benzene derivatives described in the research report of C. Destrade et al., Mol. Cryst. Vol. 71, p. 111 (1981); the truxene derivatives described in the research report of C. Destrade et al., Mol. Cryst. Vol. 122, p. 141 (1985), Physics Lett, A, Vol. 78, p. 82 (1990); the cyclohexane derivatives described in the research report of B. Kohne at el., Angew. Chem. Vol. 96, p. 70 (1984); and the aza crown and phenyl acetylene macrocycles described in the research report of J. M. Lehn et al., J. Chem. Commun., p. 1,794 (1985) and the research report of J. Zhang et al., J. Am. Chem. Soc., Vol. 116, p. 2,655 (1994), and the disclosures of the above publications are expressly incorporated by reference herein in their entireties. These discotic liquid-crystal compounds generally have a structure with a discotic base nucleus at the center of the molecule, and groups (L), such as linear alkyl groups, alkoxy groups, and substituted benzyloxy groups, substituted radially. They exhibit liquid crystallinity, and include all compounds generally referred to as discotic liquid crystals. When an aggregate of such molecules is oriented uniformly, it exhibits a negative uniaxial property. However, this description is not a limitation. The compounds described in paragraphs [0061]-[0075] of Japanese Unexamined Patent Publication (KOKAI) No. 2008-281989, the disclosure of which is expressly incorporated by reference herein in its entirety, are examples of discotic liquid-crystal compounds.

When employing a discotic liquid-crystal compound having a reactive group as a liquid-crystal compound, it can be fixed in any of the orientation states of horizontal orientation, vertical orientation, inclined orientation, and twisted orientation.

[Polymerizable Monomer]

In the composition containing a liquid-crystal compound that is used to form the optically anisotropic layer, a polymerizable monomer can be added to promote crosslinking of the liquid-crystal compound.

A monomer or oligomer undergoing addition polymerization when irradiated with light and having two or more ethylenic unsaturated double bonds can be employed as the polymerizable monomer, for example.

Examples of such monomers and oligomers are compounds having at least one addition polymerizable ethylenic unsaturated group per molecule. Examples are monofunctional acrylates and monofunctional methacrylates such as polyethylene glycol mono(meth)acrylate, polypropylene glycol mono(meth)acrylate, and phenoxyethyl(meth)acrylate; and polyfunctional acrylates and polyfunctional methacrylates such as compounds that have been (meth)acrylated after adding an ethylene oxide or propylene oxide to a polyfunctional alcohol such as trimethylolpropane or glycerin: polyethylene glycol di(meth)acrylate, polypropylene glycol di(meth)acrylate, trimethylol ethane triacrylate, trimethylol propane tri(meth)acrylate, trimethylol propane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexane diol di(meth)acrylate, trimethylol propane tri(acryloyloxypropyl)ether, tri(acryloyloxyethyl)isocyanurate, tri(acryloyloxyethyl)cyanurate, and glycerin tri(meth)acrylate.

Further examples include the urethane acrylates described in Japanese Examined Patent Publication (KOKOKU) Showa No. 48-41708, Japanese Examined Patent Publication (KOKOKU) Showa No. 50-6034, and Japanese Unexamined Patent Publication (KOKAI) Showa No. 51-37193; the polyester acrylates described in Japanese Unexamined Patent Publication (KOKAI) Showa No. 48-64183, Japanese Examined Patent Publication (KOKOKU) Showa No. 49-43191 and Japanese Examined Patent Publication (KOKOKU) Showa No. 52-30490; and polyfunctional acrylates and methacrylates such as epoxyacrylates that are the reaction products of an epoxy resin with (meth)acrylic acid, and the disclosures of the above publications are expressly incorporated by reference herein in their entireties.

Of these, trimethylol propane tri(meth)acrylate, pentaerythritol tetra(meth)acrylate, dipentaerythritol hexa(meth)acrylate, and dipentaerythritol penta(meth)acrylates are preferred.

An additional suitable example is the "polymerizable compound B" described in Japanese Unexamined Patent Publication (KOKAI) Heisei No. 11-133600, the disclosure of which is expressly incorporated by reference herein in its entirety.

These monomers and oligomers can be employed singly or in mixtures of two or more.

Cationically polymerizable monomers can also be employed. Examples include the epoxy compounds, vinyl ether compounds, oxetane compounds and the like that are given by way of example in Japanese Unexamined Patent Publications (KOKAI) Heisei No. 6-9714, No. 2001-31892, No. 2001-40068, No. 2001-55507, No. 2001-310938, No. 2001-310937, and No. 2001-220526, the disclosures of which are expressly incorporated by reference herein in their entireties.

Examples of epoxy compounds include the aromatic epoxides, alicylic epoxides, and aliphatic epoxides given below.

Examples of aromatic epoxides include bisphenol A, di- or polyglycidyl ethers of alkyleneoxide adducts thereof, hydrogenated bisphenol A and di- or polyglycidyl ethers of alkylene oxide adducts thereof, and novolac epoxy resins. Examples of alkylene oxides are ethylene oxide and propylene oxide.

Examples of alicyclic epoxides include cyclohexene oxide and cyclopentene oxide-containing compounds obtained by epoxylating a compound having at least one cycloalkane ring such as a cyclohexene or cyclopentene ring with a suitable oxidizing agent such as hydrogen peroxide or peroxide.

Preferred examples of aliphatic epoxides include aliphatic polyalcohols and di- and polyglycidyl ethers of alkylene oxide adducts thereof. Representative examples include: diglycidyl ethers of ethylene glycol, diglycidyl ethers of propylene glycol, diglycidyl ethers of 1,6-hexanediol, and other diglycidyl ethers of alkylene glycols; polyglycidyl ethers of polyalcohols such as di- or tri-glycidyl ethers of glycerin or alkylene oxide adducts thereof; diglycidyl ethers of polyethylene glycols or alkylene oxide adducts thereof; diglycidyl ethers of polypropylene glycol or alkylene oxide adducts thereof; and other diglycidyl ethers of polyalkylene glycols. Examples of the alkylene oxide include ethylene oxide and propylene oxide.

A monofunctional or difunctional oxetane monomer can be employed as a cationically polymerizable monomer in the composition of the present invention. For example, compounds such as 3-ethyl-3-hydroxymethyloxetane (product name OXT101 manufactured by Toagosei Co., Ltd.), 1,4-bis[(3-ethyl-3-oxetanyl)methoxy-methyl]benzene (OXT121, same manufacturer), 3-ethyl-3-(phenoxymethyl)oxetane (OXT211, same manufacturer), di(1-ethyl-3-oxetanyl)methylether (OXT221, same manufacturer), and 3-ethyl-3-(2-ethylhexyloxymethyl)oxetane (OXT212, same manufacturer) are preferably employed. In particular, compounds such as 3-ethyl-3-hydroxymethyloxetane, 3-ethyl-3-(phenoxymethyl)oxetane, and di(1-ethyl-3-oxetanyl)methylether, and all known functional and difunctional oxetane compounds described in Japanese Unexamined Patent Publication (KOKAI) Nos. 2001-220526 and 2001-310937, the disclosures of which are expressly incorporated by reference herein in their entireties, can be employed.

[Two or More Optically Anisotropic Layers]

When two or more optically anisotropic layers each of which is comprised of a composition containing liquid-crystal compounds is laminated, the combination of the liquid-crystal compounds is not specifically limited. Laminates of layers all comprised of rod-like liquid-crystal compounds, laminates of layers comprised of compositions containing discotic liquid-crystal compounds and compositions containing rod-like liquid-crystal compounds, and laminates of layers all comprised of discotic liquid-crystal compounds can all be employed. Nor is the combination of the orientation state of the various layers specifically limited. Laminates of optically anisotropic layers of identical orientation states can be employed, and laminates of optically anisotropic layers of differing orientation states can be employed.

[The Solvent]

An organic solvent is preferably used to prepare a coating liquid, which is used when the composition containing a liquid-crystal compound is applied on the surface of a support or an orientation layer or the like in the form of the coating liquid, described further below. Examples of organic solvents include: amides (such as N,N-dimethylformamide), sulfoxides (such as dimethylsulfoxide), heterocyclic compounds (such as pyridine), hydrocarbons (such as benzene and hexane), alkyl halides (such as chloroform and dichloromethane), esters (such as methyl acetate and butyl acetate), ketones (such as acetone, methyl ethyl ketone, methyl isobutyl ketone, and cyclohexanone), and ethers (such as tetrahydrofuran and 1,2-dimethoxyethane). The alkyl halides and ketones are preferred. Two or more organic solvents can be employed in combination.

[Fixing the Orientation]

The orientation of the liquid-crystal compound is preferably fixed by a crosslinking reaction of reactive groups introduced into the liquid-crystal compound, and more preferably fixed by a polymerization reaction of reactive groups. Polymerization reactions include a thermal polymerization reaction employing a thermal polymerization initiator and a photopolymerization reaction employing a photopolymerization initiator. A photopolymerization reaction is preferred. The photopolymerization reaction can be a radical polymerization or a cation polymerization. Examples of radical polymerization initiators include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynucleic quinone compounds (described in U.S. Pat. Nos. 3,046,127 and 2,951,758), combinations of triarylimidazole dimers and p-aminophenyl ketones (described in U.S. Pat. No. 3,549,367), acrylidine and phenazine compounds (described in Japanese Unexamined Patent Publication (KOKAI) Showa No. 60-105667 and U.S. Pat. No. 4,239,850), and oxadiazole compounds (described in U.S. Pat. No. 4,212,970), and the disclosures of the above patents and publications are expressly incorporated by reference herein in their entireties. Examples of cation photopolymerization initiators include organic sulfonium salts, iodonium salts, and phosphonium salts. The organic sulfonium salts are preferred, and triphenylsulfonium salts are particularly preferred. Hexafluoroantimonate, hexafluorophosphate, and the like are preferably employed as the counter ions of these compounds.

The quantity of photopolymerization initiator employed is preferably 0.01 to 20 weight %, more preferably 0.5 to 5 weight % of the solid component of the coating liquid. Ultraviolet radiation is preferably employed in the light irradiation to polymerize the liquid-crystal compound. The irradiation energy is preferably 10 mJ/cm$^2$ to 10 J/cm$^2$, more preferably 25 to 800 mJ/cm$^2$. The illuminance is preferably 10 to 1,000 mW/cm$^2$, more preferably 20 to 500 mW/cm$^2$, and still more preferably, 40 to 350 mW/cm$^2$. The illumination wavelength preferably has a peak at 250 to 450 nm, and more preferably has a peak at 300 to 410 nm. To promote the photopolymerization reaction, the photoillumination can be conducted in an atmosphere of an inert gas such as nitrogen or under heated conditions.

[Optical Orientation by Irradiation with Polarized Light]

The optically anisotropic layer can be a layer in which in-plane retardation is manifested or increased by optical orientation by irradiation with polarized light. Irradiation with polarized light can be conducted by referring to the description given in paragraphs [0091] and [0092] of Japanese Unexamined Patent Publication (KOKAI) No. 2009-69793, the description given in Published Japanese Translation (TOKUHYO) No. 2005-513241 of a PCT International Application (International Publication WO2003/054111), and the like, the disclosures of which are expressly incorporated by reference herein in their entireties.

[Fixing the Orientation State of a Liquid-Crystal Compound Having a Radically Reactive Group and a Cationically Reactive Group]

As set forth above, the liquid-crystal compound preferably has two or more reactive groups of differing polymerization conditions. In that case, an optically anisotropic layer containing a polymer having an unreacted reactive group can be prepared by polymerizing only a portion of the multiple types of reactive groups through the selection of conditions. Polymerization fixing conditions that are particularly suited to the case where a liquid-crystal compound having a radically reactive group and a cationically reactive group (specific examples of which are 1-8 to 1-15 above) is employed as such a liquid-crystal compound are described below.

First, it is preferable to employ only a photopolymerization initiator acting on the reactive group that is to be polymerized. That is, when selectively polymerizing a radically reactive group, it is preferable to employ only a radical photopolymerization initiator, and when selectively polymerizing a cationically reactive group, it is preferable to employ only a cation photopolymerization initiator. The quantity of photopolymerization initiator that is employed is preferably 0.01 to 20 weight %, more preferably 0.1 to 8 weight %, and still more preferably, 0.5 to 4 weight % of the solid component of the coating liquid.

Next, ultraviolet radiation is preferably used for the irradiation to induce polymerization. In this process, when the irradiation energy and/or illuminance is excessive, there is a risk that both the radically reactive group and the cationically reactive group will end up reacting non-selectively. Accordingly, the irradiation energy is preferably 5 to 500 mJ/cm$^2$, more preferably 10 to 400 mJ/cm$^2$, and still more preferably, 20 to 200 mJ/cm$^2$. The illuminance is preferably 5 to 500 mW/cm$^2$, more preferably 10 to 300 mW/cm$^2$, and more preferably, 20 to 100 mW/cm$^2$. The illumination wavelength preferably has a peak at 250 to 450 nm, and more preferably has a peak at 300 to 410 nm.

Among photopolymerization reactions, reactions employing radical photopolymerization initiators are impeded by oxygen and reactions employing cation photopolymerization initiators are not. Accordingly, when employing a liquid-crystal compound having a radically reactive group and a cationically reactive group and selectively polymerizing one of the reactive groups, it is preferable to conduct the irradiation in an atmosphere of an inert gas such as nitrogen when selectively polymerizing the radically reactive group, and preferable to conduct the irradiation in an atmosphere containing oxygen (such as air) when selectively polymerizing the cationically reactive group.

Further, when a liquid-crystal compound having a radically reactive group and a cationically reactive group are employed and one of the reactive groups is selectively polymerized, a polymerization inhibitor on the other reactive group can be preferably employed as a means of selective polymerization of the former. For example, when a liquid-crystal compound having a radically reactive group and a cationically reactive group is employed and the cationically reactive group is selectively polymerized, a small quantity of radical polymerization inhibitor can be added to enhance the selectivity. The quantity of such a polymerization inhibitor that is added is preferably 0.001 to 10 weight %, more preferably 0.005 to 5 weight %, and still more preferably, 0.02 to 1 weight % of the solid component of the coating liquid. Examples of radical polymerization inhibitors are nitrobenzene, phenothiazine, and hydroquinone. The hindered phenols that are commonly employed as oxidation inhibitors are also effective as radical polymerization inhibitors.

[Horizontal Orientation Agents]

Incorporating at least one from among the compounds represented by general formulas (1) to (3) and fluorine-containing homopolymers and copolymers employing the monomer of general formula (4) described in paragraphs [0098] to [0105] in Japanese Unexamined Patent Publication (KOKAI) No. 2009-69793, the disclosure of which is expressly incorporated by reference herein in its entirety, into the composition for forming the above optically anisotropic layer essentially horizontally orients the molecules of the liquid-crystal compound. In the present description, the term "horizontal orientation" refers, in the case of rod-like liquid crystals, to the major axis of the molecule being parallel to the horizontal surface of the support, and refers, in the case of discotic liquid crystals, to the disc surface of the core of the discotic liquid crystal compound being parallel to the horizontal surface of the support. However, it is not required that they be strictly parallel; in the present description, this refers to an orientation with an angle of incline relative to the horizontal surface of less than 10 degrees, preferably to an angle of incline of 0 to 5 degrees, more preferably to an angle of incline of 0 to 3 degrees, still more preferably to an angle of incline of 0 to 2 degrees, and optimally, to an angle of incline of 0 to 1 degree.

The quantity of the horizontal orientation agent is preferably 0.01 to 20 weight %, more preferably 0.01 to 10 weight %, and still more preferably, 0.02 to 1 weight % of the weight of the liquid-crystal compound. The compounds represented by general formulas (1) to (4) described in paragraphs [0098] to [0105] in Japanese Unexamined Patent Publication (KOKAI) No. 2009-69793 can be employed singly or in combinations of two or more.

[An Optically Anisotropic Layer Prepared by Stretching]

The optically anisotropic layer can be prepared by stretching a polymer. The optically anisotropic layer preferably contains at least one unreacted reactive group. When preparing such a polymer, a polymer that already has reactive groups can be stretched, or a coupling agent or the like can be employed on the optically anisotropic layer to introduce a reactive group after stretching. An optically anisotropic layer obtained by stretching is characterized by low cost, self-supporting capability (obviating the need for a support to form and maintain the optically anisotropic layer), and the like.

[Two or More Optically Anisotropic Layers]

As described above, birefringence pattern builders can contain two or more optically anisotropic layers. The two or more optically anisotropic layers can be adjacent in the normal direction, or a functional layer can be sandwiched between them. The retardation of the two or more optically anisotropic layers can be approximately equivalent, or can be different. The slow axes can be approximately identically oriented, or can be oriented in different directions. By using two or more optically anisotropic layers the slow axes of which are oriented in approximately identical directions, a pattern with a high degree of retardation can be prepared.

A birefringence pattern builder having two or more optically anisotropic layers can be prepared, for example, by the methods of directly forming an optically anisotropic layer on a birefringence pattern builder, and by employing a separate birefringence pattern builder as a transfer material to transfer an optically anisotropic layer onto a birefringence pattern builder. Of these methods, the method of employing a separate birefringence pattern builder as a transfer material to transfer an optically anisotropic layer onto a birefringence pattern builder is preferred.

[After-Treatment of the Optically Anisotropic Layer]

Various after-treatments can be used to modify the optically anisotropic layer that has been prepared. Examples of after-treatments include corona treatment to enhance adhesion, the addition of plasticizers to enhance flexibility, the addition of thermal polymerization inhibitors to enhance storage properties, and coupling processing to enhance reactivity. When the polymer in the optically anisotropic layer has an unreacted reactive group, the addition of a polymerization initiator corresponding to the reactive group is an effective means of modification. For example, by the addition of a radical photopolymerization initiator to an optically anisotropic layer in which the orientation of a liquid-crystal compound containing cationically reactive groups and radically reactive groups has been fixed with a cation photopolymerization initiator, the reaction of the unreacted radically reactive group can be promoted when patterned light exposure is subsequently conducted. Examples of means of adding plasticizers and photopolymerization initiators include immersing the optically anisotropic layer in a solution of the corresponding additive, and applying a solution of the corresponding additive on the optically anisotropic layer to permeate it. A method using an additive layer can also be employed, in which, when applying another layer on the optically anisotropic layer, the additive is first added to a coating liquid of the other layer, and then the additive is caused to permeate the optically anisotropic layer. In this process, it is possible to adjust the relation between the level of exposure of individual regions during patterned light exposure of the birefringence pattern builder, described further below, and the final retardation of the various regions that is achieved, and approximate desired material properties based on the additive that is used in the permeation, particularly the type and quantity of photopolymerization initiator.

The additive layer that is formed on the optically anisotropic layer can also functions as a photosensitive resin layer such as a photoresist, a surface layer such as a scattering layer that controls reflective gloss, a hardcoat layer that prevents scratching of the surface, a water-repellent and oil-repellent layer that prevents the sticking of fingerprints and doodling with markers and the like, or an antistatic layer that prevents the adhesion of debris due to charge buildup. At least one polymer and at least one photopolymerization initiator are preferably contained in a photosensitive resin layer. The polymer is not specifically limited, but a material with a high Tg is preferred to impart hardcoat properties.

[The Support]

The birefringence pattern builder may have a support to ensure dynamic stability. The support in the birefringence pattern builder can serve as a support in the patterned birefringent product, or the support in the patterned birefringent product can be provided separately from the support in the birefringence pattern builder (by replacement of or addition to the support in the birefringence pattern builder during or after the formation of the birefringence pattern). The support is not specifically limited. Both rigid and flexible supports can be employed. There are no specific limitations on rigid supports. Examples include a soda glass sheet with a silicon oxide surface coating, low-expansion glass, nonalkali glass, quartz glass sheets, and other known glass sheets; aluminum plates, iron plates, SUS plates, and other metal plates; resin sheets; ceramic sheets; and stone sheets. There are no specific limitations on flexible supports. Examples include cellulose esters (such as cellulose acetate, cellulose propionate, and cellulose butyrate), polyolefins (such as norbornene polymers), poly(meth)acrylic acid esters (such as polymethyl methacrylate), polycarbonates, polyesters, polysulfones, norbornene polymers, other plastic films, paper, aluminum foil, and cloth. Due to ease of handling, the thickness of the rigid support is preferably 100 to 3,000 micrometers, more preferably 300 to 1,500 micrometers. The thickness of the flexible support is preferably 3 to 500 micrometers, and more preferably, 10 to 200 micrometers. The support preferably has heat resistance adequate to prevent deformation and coloration during baking, described further below. Instead of the reflective layer described further below, it may also preferable for the support to have a reflecting function.

[The Orientation Layer]

As set forth above, an orientation layer can be employed in the formation of the optically anisotropic layer. The orientation layer is generally provided on the support or temporary support, or on an undercoating layer that is applied on the support or temporary support. The orientation layer functions to determine the orientation of the liquid-crystal compound provided on it. The orientation layer can be any layer that imparts an orientation to the optically anisotropic layer. Preferred examples of the orientation layer include rubbed layers of organic compounds (preferably polymers); optical orientation layers that exhibit a liquid-crystal orienting property by irradiation with polarized light, such as azobenzene polymers and polyvinyl cinnamate; oblique vapor-deposition layers of inorganic compounds; microgrooved layers; cumulative films of omega-tricosanoic acid, dioctadecyl methyl ammonium chloride, methyl stearate or the like formed by the Langmuir-Blodgett method (LB method); and films in which a dielectric is oriented by imparting an electric or magnetic field. In the rubbed form of orientation films, polyvinyl alcohol is preferably contained, and the ability to crosslink with at least one layer either above or below the orientation layer is particularly preferred. An optical orientation layer and microgrooves are preferred as methods of controlling the direction of orientation. Compounds that exhibit orientation based on dimers, such as polyvinyl cinnamate, are particularly preferred as optical orientation layers. Embossing with a master roll manufactured in advance by mechanical or laser processing is particularly preferable for microgrooves.

[The Adhesive Layer]

The birefringence pattern builder can have an adhesive layer for adhering the patterned birefringent product that has been prepared to other products after the patterned light exposure and baking described further below. The material of the adhesive layer is not specifically limited, but a material that retains adhesiveness even after the baking step in the production of a birefringence pattern is preferred. The adhesive layer can be formed on the patterned birefringent product after formation of the birefringence pattern.

[The Coating Method]

Various layers such as the optically anisotropic layer and the orientation layer can be formed by application of a coating solution by the dip coating method, air knife coating method, spin coating method, slit coating method, curtain coating method, roller coating method, wire bar coating method, gravure coating method, and extrusion coating method (U.S. Pat. No. 2,681,294, the disclosure of which is expressly incorporated by reference herein in its entirety). Two or more layers can be simultaneously applied. Simultaneous application methods are described in U.S. Pat. Nos. 2,761,791, 2,941,898, 3,508,947, and 3,526,528, and in Yuji Harazaki, Coating Technology, p. 253, Asakura Shoten (1973), the disclosures of which are expressly incorporated by reference herein in their entireties.

[Preparation of a Product Having a Patterned Optically Anisotropic Layer]

A product having a patterned optically anisotropic layer can be prepared by at least sequentially patterned light exposing and heating (baking) a birefringence pattern builder.

[Patterned Light Exposure]

In the present description, the term "patterned light exposure" means exposure conducted in a manner that some of the regions of a birefringence pattern builder are exposed to light or exposure conducted under different exposure conditions in two or more regions. In exposures conducted under different exposure conditions to each other, no exposure (unexposed regions) may be included. The patterned light exposure technique employed can be contact exposure with a mask, proximity exposure, projection exposure, or the like. Scanning exposure in which a laser, electron beam, or the like is focused on a determined position, without employing a mask, to directly draw an image can also be employed. The illumination wavelength of the light source used in exposure preferably has a peak at 250 to 450 nm, and more preferably, has a peak at 300 to 410 nm. Specific examples include ultra-high-pressure mercury lamps, high-pressure mercury lamps, metal halide lamps, and blue lasers. The preferred exposure level is normally about 3 to 2,000 mJ/cm$^2$, more preferably about 5 to 1,000 mJ/cm$^2$, and optimally, about 10 to 500 mJ/cm$^2$. The resolution in patterned light exposure is preferably 1,200 dpi or higher to permit the formation of a microprint latent image. To increase the resolution, it is preferable and necessary for the patterned optically anisotropic layer to be solid during patterned light exposure, and for the thickness to be 10 micrometers or less. To achieve a thickness of 10 micrometers or less, the patterned optically anisotropic layer is preferably formed of a layer containing a polymerizable liquid-crystal compound the orientation of which has been fixed. More preferably, the polymerizable liquid-crystal compound contains two or more types of reactive groups with different crosslinking mechanisms.

[The Exposure Conditions During Patterned Light Exposure]

In the course of conducting the exposure of two or more regions of the birefringence pattern builder under mutually different exposure conditions, the "two or more regions" may or may not have overlapping portions. However, the regions preferably do not have overlapping portions. Patterned light exposure can be conducted in multiple exposure cycles; can be conducted for example in a single exposure cycle using a mask or the like having two or more regions exhibiting different transmission spectra based on the region; or the two can be combined. That is, during patterned light exposure, exposure can be conducted such that two or more regions that have been exposed under different exposure conditions are produced. The scanning exposure is preferable because, in the scanning exposure, the exposure conditions can be varied for each region by the techniques of varying the light source intensity by exposure region, changing the illumination spots of the exposure regions, changing the scan rate, and the like.

The exposure conditions are not specifically limited. Examples include the peak exposure wavelength, the exposure illuminance, the exposure time, the exposure level, the temperature during exposure, and the atmosphere during exposure. Of these, from the perspective of the ease of adjusting exposure conditions, the peak exposure wavelength, the exposure illuminance, the exposure time, and the exposure level are preferred, and the exposure illuminance, exposure time, and exposure level are more preferred. The regions that are exposed under mutually different exposure conditions during patterned light exposure are subsequently subjected to a baking step and exhibit mutually different birefringence that is controlled based on the exposure conditions. In particular, different retardation values are imparted to the regions. That is, by adjusting the exposure conditions for each region during patterned light exposure, a birefringence pattern of desired retardation that differs by region can be obtained after the baking step. The exposure conditions can be varied continuously or discontinuously between two or more exposure regions being exposed under different exposure conditions.

[Mask Exposure]

Exposure employing an exposure mask is useful as a means of producing exposure regions under different exposure conditions. For example, exposure can be conducted with an exposure mask so that only one region is exposed. Then exposure with a separate mask or total surface exposure can be conducted with the temperature, atmosphere, exposure illuminance, exposure time, and exposure wavelength changed. In this manner, exposure conditions of the region exposed first and the regions subsequently exposed can be readily changed. Masks having two or more regions exhibiting different transmission spectra to each other are particularly useful as masks for changing the exposure illuminance or exposure wavelength. In that case, different exposure illuminances and exposure wavelengths in multiple regions can be achieved in a single exposure cycle. Different exposure levels can also be imparted with an identical period of exposure under different exposure illuminances.

[Scanning Exposure]

Scanning exposure can be conducted by applying an image drawing device to form a desired two-dimensional pattern on a drawing surface with light, for example.

One representative example of such a drawing device is an image recording device that is configured to use a laser beam deflection scanning means to scan an object that is being scanned with a laser beam directed from a laser beam generating means to record a prescribed image or the like. This type of image recording device modulates the laser beam being directed from the laser beam generating means based on an image signal during the recording of the image or the like (Japanese Unexamined Patent Publication (KOKAI) Heisei No. 7-52453, the disclosure of which is expressly incorporated by reference herein in its entirety).

A device in which recording is conducted by scanning a laser beam in a secondary scan direction on an object being scanned that has been adhered on the outer circumference surface of a drum rotating in a primary scan direction, and a device in which recording is conducted by rotationally scanning a laser beam over an object being scanned that has been adhered to the cylindrical inner circumference surface of a drum can be employed (Japanese Patent No. 2,783,481, the disclosure of which is expressly incorporated by reference herein in its entirety).

A drawing device forming a two-dimensional pattern on a drawing surface with a drawing head can also be employed. For example, an exposure device forming a desired two-dimensional pattern on the exposure surface of a photosensitive material or the like with an exposure head, which is employed to fabricate semiconductor substrates and print plates, can be employed. A typical example of such an exposure head is equipped with a pixel array with multiple pixels that generates a group of light points constituting a desired two-dimensional pattern. By operating this exposure head while displacing it relative to an exposure surface, a desired two-dimensional pattern can be formed on the exposure surface.

As an exposure device such as those set forth above, for example, an optical device has been proposed that forms a desired image on an exposure surface by displacing a digital micromirror device (DMD) in a prescribed scan direction on an exposure surface, inputting frame data comprised of multiple drawing point data corresponding to the multiple micromirrors into the memory cells of the DMD based on the displacement in the scan direction, and sequentially forming a group of drawing points corresponding to the micromirrors of the DMD in a time series (Japanese Unexamined Patent Publication (KOKAI) No. 2006-327084, the disclosure of which is expressly incorporated by reference herein in its entirety).

In addition to the above DMD, a transmitting-type spatial light-modulating element can be employed as the spatial light-modulating element provided on an exposure head. The spatial light-modulating element can be of either the reflecting type or transmitting type. Additional examples of spatial light-modulating elements include the micro-electrical mechanical system (MEMS) type of spatial light-modulating element (special light modulator (SLM)), optical elements that modulate transmitted light by means of an electro-optical effect (PLZT elements), liquid-crystal light shutters (FLC), and other liquid-crystal shutter arrays. The term "MEMS" is a general term for microsystems integrating microscopic sensors, actuators, and control circuits by means of micromachining technology based on IC manufacturing processes. The term "MEMS-type spatial light-modulating element" means a spatial light-modulating element that is driven by electromechanical operation utilizing electrostatic forces.

A device in which multiple grating light valves (GLVs) are disposed in a two-dimensional configuration can also be employed.

In addition to the above laser beam source, lamps and the like can be employed as the light sources of the exposure head.

[Patterned Light Exposure of Two or More Optically Anisotropic Layers]

A new transfer material for building birefringence patterns can also be transferred onto a laminate obtained by patterned light exposure on a birefringence pattern builder, and then patterned light exposure can be conducted again. In that case, the retardation values remaining following baking in a region that remains unexposed both the first and second times (which normally have the lowest retardation values), a region that is exposed the first time but is not exposed the second time, and a region that is exposed both the first and second times (which normally have the highest retardation values) can be effectively changed. Regions that are not exposed the first time but are exposed the second time can be thought of as being identical after the second exposure to regions that have been exposed both the first and second times. Similarly, by alternately conducting transfer and patterned light exposure three or four times, four or more regions can be readily prepared. This method is useful when it is desirable to impart differences (differences in optical axis direction, extremely large differences in retardation, and the like) to different regions that cannot be imparted by means of exposure conditions alone,

[Heating (Baking)]

A birefringence pattern can be prepared by heating a birefringence pattern builder that has been subjected to the patterned light exposure at 50° C. or higher but not higher than 400° C., preferably at 80° C. or higher but not higher than 400° C.

The birefringence pattern can contain a region in which the retardation is essentially 0. For example, when an optically anisotropic layer is formed employing a liquid-crystal compound having two or more reactive groups, portions that remain unexposed following patterned light exposure lose their retardation during baking, resulting in a retardation of essentially 0.

Also, a new transfer material for building a birefringence pattern can be transferred onto a birefringence pattern builder that has been baked, after which patterned light exposure and baking can be conducted anew. In that case, combining the first and second exposure conditions, the retardation value remaining after the second baking can be effectively changed. This method is useful when it is desirable to form two regions with birefringence properties that mutually differ in the directions of the slow axes in shapes that do not overlap.

[Thermal Writing]

As set forth above, a retardation of essentially 0 can be achieved by baking unexposed regions. Thus, in addition to a pattern based on patterned light exposure, a pattern based on thermal writing can be included in a product having a patterned optically anisotropic layer. Thermal writing can be conducted with a thermal head, or by drawing with an IR or YAG laser or the like. For example, a small printer having a thermal head can be used in combination, and thermal writing IR and YAG lasers that are usually used for corrugated fiberboard containers can be used without any modification.

[Functional Layers Laminated on Birefringence Patterns]

After exposing and baking the birefringence pattern builder to form a birefringence pattern as set forth above, functional layers with various functions can be laminated to obtain a patterned birefringent product. The functional layers are not specifically limited. Examples include a surface layer and a printed layer.

[Surface Layers]

Examples of surface layers include a scattering layer that controls the reflection gloss, a hardcoat layer that prevents scratching of the surface, a water-repellent and oil-repellent layer that prevents the sticking of fingerprints and doodling with magic markers, and an antistatic layer that prevents the adhesion of debris due to charge buildup. The scattering layer is preferably a surface irregularity layer formed by embossing or a matte layer that contains matting agents such as particles. The hardcoat layer is preferably a layer containing at least one bifunctional or higher polymerizable monomer, that have been polymerized by irradiation with light or by heating. The surface layer can also be provided on the birefringence pattern builder before pattern formation. The surface layer can be provided in advance on the birefringence pattern builder as an additive layer, for example.

[Protective Layers]

Nonuniformity due to optical interference sometimes appears, particularly in embodiments employing semi-transmissive-half-reflective layers. To reduce the difference in refractive index with the optically anisotropic layer, a protective layer with a refractive index of 1.4 to 1.7 and a thickness of 30 micrometers or more, preferably 50 micrometers or more, more preferably 100 micrometers or more is preferably bonded to the product in a state of optical contact. The nonuniformity thus can be reduced. A refractive index-matching oil, adhesive, or contact adhesive can be employed to achieve optical contact. For the sake of convenience, an adhesive or contact adhesive is preferred.

[Driven-Type Optically Anisotropic Layer]

As mentioned above, the birefringent layer may be a driven-type optically anisotropic layer.

A driven-type optically anisotropic layer refers to a layer in which the phase of polarized light is electrically or magnetically controlled by an electrooptic effect or a magnetooptic effect with an anisotropic optical crystal or a liquid crystal material. In the present invention, it is preferable to use a layer similar to the liquid crystal layer in the liquid crystal cell generally used, as the driven-type optically anisotropic layer.

A liquid crystal cell is generally a cell in which two electrode substrates maintained at a fixed interval sandwiches a layer containing a liquid crystal compound whose molecules aligns by applying voltage. In the product of the present invention, a transparent electrode layer such as ITO or a conductive polymer layer is used for the electrode layer at the display side, and a transparent electrode layer or a semi-transmissive-half-reflective electrode layer is used at the non-display side. The above-mentioned semi-transmissive-half-reflective layer may be a semi-transmissive-half-reflective electrode. Namely, in this case, the product of the present invention may contain a semi-transmissive-half-reflective layer (electrode), a birefringent layer (driven-type optically anisotropic layer), a transparent electrode layer, and a polarizing layer in this order. A layer thinly formed from a metal such as aluminum or silver which has reflexibility when it has a sufficient thickness, or a layer formed by carrying out mutual lamination of a high refractive-index transparent electric conductive layer such as ITO and a low refractive-index transparent layer such as $SiO_2$ can be used for the semi-transmissive-half-reflective electrode. When a transparent electrode is used for the non-display side, a semi-transmissive-half-reflective layer is needed separately.

A TFT substrate may be used as the transparent electrode layer.

Between the electrode layer and the driven-type optically anisotropic layer, other layers such as an orientation layer for an orientation of a drive liquid crystal molecule may be contained. Moreover, other layers such as a color filter layer may be contained between the electrode layer and the semi-transmissive-half-reflective layer or between the electrode layer and the polarizing layer.

In order to make the liquid crystal molecule in a driven-type optically anisotropic layer drive, a passive-matrix system that uses an electrode wiring installed in all directions, or an active matrix system that uses switching elements such as TFT formed for every pixel can be used. Although almost all liquid crystal cell modes, such as STN, TN, VA, OCB, ECB, and Blue Phase which are used for displays, can be used as the driven-type optically anisotropic layer in the present invention. ECB OCB, VA, and Blue Phase are preferable from a viewpoint of controlling the in-plane phase differential.

In IPS mode, a cell which does not have electrodes upside and downside but has two rows of comb type electrodes at one side is used, and the cell is driven by parallel field. The cell in IPS mode thus differs from the structure of a general liquid crystal cell. In IPS mode, the in-plane phase differential does not change, and thus application of IPS mode to the present invention is accompanied by some restrictions as the in-plane phase differential does not change the value of in-plane phase differential. However, IPS mode can also be used, if the semi-transmissive-half-reflective layer is formed in the non-display side.

[Application of the Product of the Present Invention]

The product of the present invention is useful to give specific information only at one side on the surface of a product such as a transparent window glasses. For example, when candidate customers are at one side and those who are not customers are at the opposite side, an image required only for the customer side can be displayed by sticking the product of the present invention on a transparent window. As a more specific example, when the product of the present invention is used for a window of an office building, an advertisement is displayed to an outside customer, but it can avoid being visible in an advertisement from the inside of the office.

Moreover, an advertisement or an ornament can be provided on a lens surface without spoiling a user's field of view by preparing the product of the present invention on the lens surface of glasses such as sunglasses and skiing goggles.

EXAMPLES

The present invention is described in greater detail below through examples. The materials, reagents, material quantities, and their ratios, operations, and the like indicated in the examples below can be suitably modified without departing from the scope or spirit of the present invention. Accordingly, the scope of the present invention is not limited to the specific examples given below.

(Preparation of Orientation Layer Coating Liquid AL-1)

The following composition was prepared, passed through a polypropylene filter with a pore size of 30 micrometers, and employed as orientation layer coating liquid AL-1.

| Orientation layer coating liquid composition (weight %) | |
|---|---|
| Polyvinyl alcohol (PVA205, manufactured by Kuraray | 3.21 |
| Polyvinyl pyrrolidone (Luvitec K30, manufactured by BASF) | 1.48 |

| Orientation layer coating liquid composition (weight %) | |
|---|---|
| Distilled water | 52.10 |
| Methanol | 43.21 |

(Preparation of Optically Anisotropic Layer Coating Liquid LC-1)

The following composition was prepared, passed through a polypropylene filter with a pore size of 0.2 micrometers, and employed as optically anisotropic layer coating liquid LC-1.

LC-1-1 was a liquid-crystal compound with two reactive groups. One of the two reactive groups was a radically reactive group in the form of an acrylic group, and the other was a cationically reactive group in the form of an oxetane group.

| Optically anisotropic layer coating liquid composition (weight %) | |
|---|---|
| Polymerizable liquid crystal compound (LC-1-1) | 32.83 |
| Horizontal orientation agent (LC-1-2) | 0.35 |
| Cation photopolymerization initiator (CPI100-P, manufactured by San-Apro) | 0.66 |
| Polymerization controlling agent (IRGANOX1076, manufactured by Ciba Specialty Chemicals (Ltd.)) | 0.07 |
| Methyl ethyl ketone | 48.09 |
| Cyclohexanone | 20.00 |

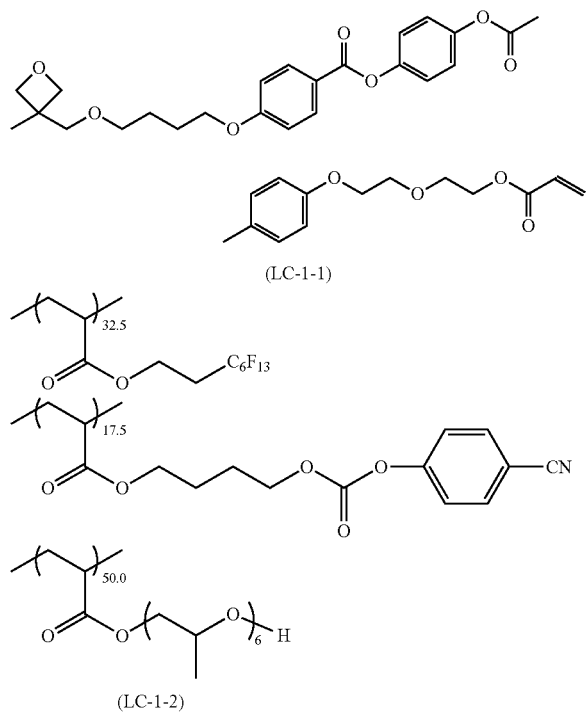

(Preparation of Additive Layer Coating Liquid OC-1)

The composition below was prepared, passed through a polypropylene filter with a 0.2 micrometer pore size, and employed as additive layer coating liquid OC-1. The compound 2-trichloromethyl-5-(p-styrylstyryl)-1,3,4-oxadiazole was employed as radical photopolymerization initiator RPI-1.

| Additive layer coating liquid composition (weight %) | |
|---|---|
| Binder (B-1) | 27.44 |
| Radical photopolymerization initiator (RPI-1) | 0.49 |
| MEGAFAC F-176PF (manufactured by Dainippon Ink and Chemicals Inc.) | 4.65 |
| Methyl ethyl ketone | 67.42 |

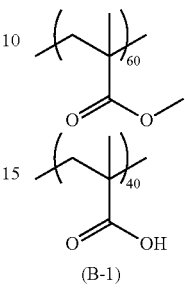

(B-1)

Example 1

Preparation of Birefringence Pattern Builder P-1)

Aluminum was vapor-deposited onto a polyethylene naphthalate film of 50 micrometers in thickness (Teonex Q83, manufactured by Teijin DuPont (Ltd.)) to fabricate a support with a semi-transmissive-half-reflective layer of transmittance of 35% and reflectance of 54%. A wire bar was used to apply orientation layer coating liquid AL-1 on the surface on which the aluminum had been vapor deposited and the coating liquid was dried. The dry film thickness was 0.5 micrometer. After a rubbing treatment of the orientation layer, a wire bar was used to apply optically anisotropic layer coating liquid LC-1. Drying was conducted for 2 minutes at a film surface temperature of 80° C. to achieve a liquid-crystal phase state. The applied layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 1.5-micrometer-thick optically anisotropic layer. The ultraviolet ray employed was 1000 mW/cm$^2$ illuminance in the range of UV-A (integrated value in the wavelength between 320 and 400 nm), and 800 mJ/cm$^2$ irradiation energy in the range of UV-A. The retardation of the optically anisotropic layer was 150 nm. The optically anisotropic layer was formed of polymer which was solid at 20° C., and presented MEK (methyl ethyl ketone)-resistance. Finally, additive layer coating liquid OC-1 was applied on the optically anisotropic layer and dried to form a 0.8 micrometer additive layer, thereby fabricating birefringence pattern builder P-1.

Figure 12:
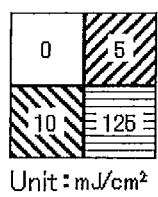
FIG. 12: Diagrams showing the pattern of the patterned light exposure conducted in Examples and the exposure level of each region.
Figure 13:
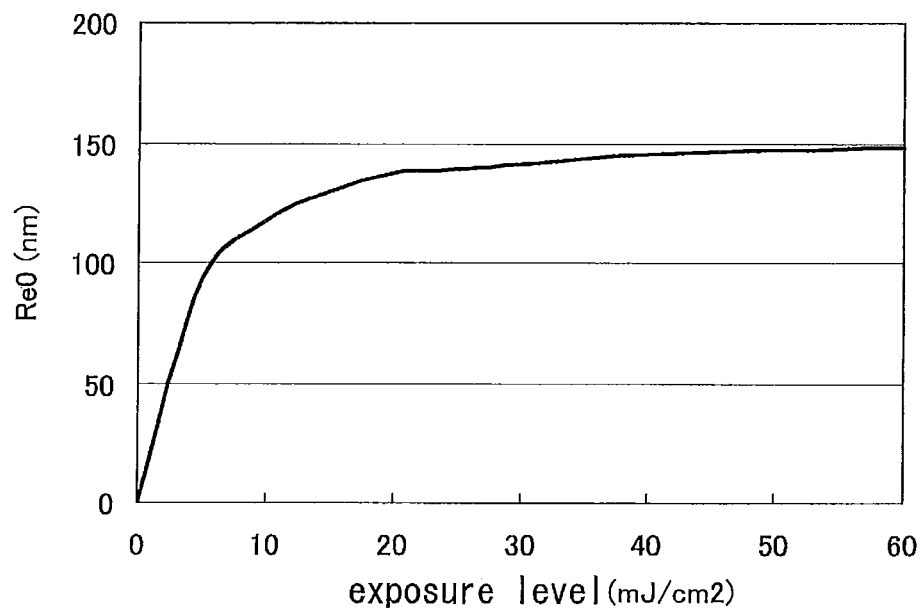
FIG. 13: Diagrams showing the relation between the retardation and the exposure level at the patterned exposure.

Birefringence pattern builder P-1 was subjected to a patterned light exposure with exposure levels of 0 mJ/cm$^2$, 5 mJ/cm$^2$, 10 mJ/cm$^2$, 125 mJ/cm$^2$ as shown in FIG. 12 by using a digital exposure device of laser scanning exposure (INPREX IP-3600H manufactured by Fuji Film Co., Ltd.). Subsequently, baking was conducted in a clean oven at 230° C. for one hour to produce a patterned birefringent product P-2. A graph showing the relation between the retardation finally obtained after the baking and the exposure level at the patterned light exposure in the product prepared by using birefringence pattern builder P-1 is shown in FIG. 13.

On this patterned optically anisotropic layer, the iodine polarizing plate (HLC-5618, manufactured by Sanritz Corporation) was bonded such that its transmission axis becomes 45 degrees to the slow axis of the optically anisotropic layer, and the optical product of Example 1 of the present invention were produced. The pattern in the produced optical product was able to be seen from the side to which the polarizing plate was bonded, but the pattern did not appear at the opposite side.

Example 2

Production of a Liquid Crystal Cell

A wiring of 100×100 was formed on a 0.5-mm-thick glass substrate, to form a pixel electrode with a size of 1×1 mm. With the wiring, a liquid crystal cell substrate was prepared by using aluminum to form a semi-transmissive-half-reflective layer of 35% of transmittance and 54% of reflectance as the electrode part. The ITO electrode was formed on the 0.5-mm-thick glass substrate at the opposite substrate to obtain a glass substrate of a passive drive system. Subsequently, SE7210 (product manufactured by Nissan chemical industries Inc.), which is a solvent soluble type polyimide precursor, was applied to both of the substrates, heated for 30 minutes at 200° C. to form a polyimide orientation layer. Furthermore, the two substrates were rubbed, and then the liquid crystal cell was produced using a 10-micrometer film spacer such that the rubbing directions of the two substrates are parallel. ZLI-2359 (Δn=0.0512, manufactured by Merck Co.) was filled into the cell to produce an ECB cell. A polarizing plate (HLC-5618, manufactured by Sanritz Corporation) was bonded such that a transmission axis achieved 45 degrees to the rubbing direction at the opposite side of the semi-transmissive-half-reflective electrode of the ECB cell. An optical product using the liquid crystal cell of Example 2 was thus produced. By applying voltage to this liquid crystal cell, retardation could be controlled for each pixel. Coloring of each pixel according to the retardation was visually recognized from the polarizing plate side, and a pattern of the coloring was not recognized from the opposite side.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

KEY TO THE NUMBERS

101 Patterned optically anisotropic layer
11 (Temporary) support
12 Optically anisotropic layer
13 Semi-transmissive-half-reflective layer
14 Orientation layer
15 Adhesive layer
16 Printed layer
17 Dynamic property control layer
18 Transfer layer
19 Additive layer or surface layer
20 Polarizing layer

The invention claimed is:

1. A product comprising a semi-transmissive-half-reflective layer having transmittance of 30% or higher and a reflectance of 30% or higher, a birefringent layer, and a polarizing layer in this order, and not comprising, at the opposite side of the polarizing layer with respect to the birefringent layer, a polarizing layer,
wherein the birefringent layer is a patterned optically anisotropic layer having two or more regions of different birefringence in the form of a pattern.

2. The product according to claim 1, wherein the regions of different birefringence in the form of a pattern are regions of different retardation or different slow axis.

3. The product according to claim 1, wherein the patterned optically anisotropic layer comprises a region of retardation of 30 to 1000 nm and a region of retardation less than 30 nm.

4. The product according to claim 1, wherein the patterned optically anisotropic layer is a layer that is formed of a composition comprising a liquid-crystal compound having at least one reactive group.

5. The product according to claim 4, wherein the patterned optically anisotropic layer is formed by a method comprising steps (1) to (3) below:
(1) irradiating with heat or light a layer formed of a composition comprising a liquid-crystal compound;
(2) subjecting the layer to a patterned light exposure; and
(3) heating the layer obtained to 50° C. or higher but not higher than 400° C.

6. A product comprising a semi-transmissive-half-reflective layer having a transmittance of 30% or higher and a reflectance of 30% or higher, a birefringent layer, and a polarizing layer in this order, and not comprising, at the opposite side of the polarizing layer with respect to the birefringent layer, a polarizing layer, wherein the birefringent layer is a driven-type optically anisotropic layer.

7. The product according to claim 6, wherein the driven-type optically anisotropic layer is a layer comprising a liquid-crystal compound driven by voltage application and the product comprises two electrode layers for the voltage application.

8. The product according to claim 7, wherein one of the two electrode layers is the semi-transmissive-half-reflective layer.

9. The product according to claim 1, wherein the polarizing layer is an absorption-type polarizing layer prepared by uniaxially stretching a film comprising a polyvinyl alcohol doped with iodine or a dichroism pigment.

10. The product according to claim 6, wherein the polarizing layer is an absorption-type polarizing layer prepared by uniaxially stretching a film comprising a polyvinyl alcohol doped with iodine or a dichroism pigment.

11. The product according to claim 8, wherein the polarizing layer is an absorption-type polarizing layer prepared by uniaxially stretching a film comprising a polyvinyl alcohol doped with iodine or a dichroism pigment.

12. The product according to claim 1, wherein the polarizing layer is a reflection-type polarizing layer prepared by uniaxially stretching a laminated film formed by carrying out alternate lamination of two kind of polymer layers of different birefringence each of which is 20 to 300 nm in thickness.

13. The product according to claim 6, wherein the polarizing layer is a reflection-type polarizing layer prepared by uniaxially stretching a laminated film formed by carrying out alternate lamination of two kind of polymer layers of different birefringence each of which is 20 to 300 nm in thickness.

14. The product according to claim 1, wherein the polarizing layer is a layer comprising a cholesteric liquid-crystal to selectively reflect circular polarized light.

15. The product according to claim 1, wherein the polarizing layer is a layer comprising a mixture of a polymeric liquid-crystal compound and a dichroism pigment being oriented by using the liquid-crystallinity and then fixed in the orientation by polymerization.

16. The product according to claim 1, wherein the polarizing layer is a layer comprising a liquid-crystal dichroism pigment being oriented by using the liquid-crystallinity.

17. An advertisement, which comprises the product according to claim 1.

18. Window glass which is applied with the product according to claim 1.

19. A pair of eyeglasses which is applied with the product according to claim 1.

20. Window glass which is applied with the product according to claim 6.

* * * * *